(12) United States Patent
Akasaka

(10) Patent No.: US 7,188,893 B2
(45) Date of Patent: Mar. 13, 2007

(54) VEHICLE FRONT BODY STRUCTURE

(75) Inventor: Kosuke Akasaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 10/962,554

(22) Filed: Oct. 12, 2004

(65) Prior Publication Data
US 2005/0082876 A1 Apr. 21, 2005

(30) Foreign Application Priority Data
Oct. 16, 2003 (JP) .............................. 2003-356952

(51) Int. Cl.
B62D 25/00 (2006.01)
(52) U.S. Cl. ................. 296/204; 296/209; 296/187.08; 296/193.08
(58) Field of Classification Search ............ 296/193.07, 296/193.09, 204, 205, 203.02, 187.01, 187.03, 296/187.08, 187.09, 187.12, 193.01, 209, 296/203.03
See application file for complete search history.

(56) References Cited
U.S. PATENT DOCUMENTS
5,127,704 A 7/1992 Komatsu

| 5,549,349 A | * | 8/1996 | Corporon et al. ...... 296/187.12 |
| 6,540,286 B2 | * | 4/2003 | Takemoto et al. .......... 296/204 |
| 6,793,276 B2 | * | 9/2004 | Sugihara et al. ............ 296/204 |
| 2001/0028179 A1 | * | 10/2001 | Takemoto et al. .......... 296/204 |
| 2002/0195840 A1 | | 12/2002 | Mishima et al. |
| 2003/0034673 A1 | * | 2/2003 | Sugihara et al. ............ 296/204 |

FOREIGN PATENT DOCUMENTS
JP 6-67271 9/1994
JP 10-007022 1/1998

* cited by examiner

Primary Examiner—Lori L. Coletta
(74) Attorney, Agent, or Firm—Rankin, Hill, Porter & Clark LLP

(57) ABSTRACT

A front part structure of a vehicle body for efficiently absorbing collision energy acting from the front of the vehicle body is provided. The front part structure of the vehicle body includes right and left front side members extending longitudinally of the vehicle body within an engine compartment separated by a dashboard. A crossmember is attached to the dashboard and extended between the right and left front side members. A floor tunnel extending longitudinally of the vehicle body is joined to a rear end portion of an extension of the crossmember. Collision energy acting from the front of the vehicle body is transmitted from the front side members to the crossmember, and then is transmitted through the extension of the crossmember to the floor tunnel and dispersed throughout the vehicle body.

3 Claims, 19 Drawing Sheets (EMBODIMENT)

(EMBODIMENT)

(COMP. EX.)

(EMBODIMENT)

(COMP. EX.)

(EMBODIMENT)

(EMBODIMENT)

(COMP. EX.)

VEHICLE FRONT BODY STRUCTURE

FIELD OF THE INVENTION

The present invention relates to a front part structure of a vehicle body, and more particularly, to an improvement in a dashboard portion.

BACKGROUND OF THE INVENTION

A front part structure of a vehicle body in which a crossmember is provided at a dashboard is disclosed in Japanese Patent Laid-Open Publication No. HEI-10-7022, for example. This vehicle front body structure will be described with reference to FIGS. 19 and 20 hereof.

As shown in FIGS. 19 and 20, a vehicle body 200 is partitioned into an engine compartment 202 and a passenger compartment 203 by a dashboard 201. The dashboard 201 is formed at its bottom central portion with a hollow tunnel 204 extending fore and aft of the dashboard 201. A crossmember 205 is joined along the bottom of the dashboard 201. A propeller shaft and a muffler (not shown) are extended through the tunnel 204.

Generally, rearward of the tunnel 204 is provided a floor tunnel extending longitudinally of the vehicle body 200 within the passenger compartment 203. In the engine compartment 202, an engine is mounted via a subframe to right and left front side members extending longitudinally of the vehicle body 200.

Reference numeral 211 denotes a cowl upper portion. A steering device is supported by a bracket 212.

Collision energy acting from the front of the vehicle body 200 is transmitted to the right and left front side members. In order to effectively absorb such collision energy, it is preferable to extend a crossmember between the right and left front side members along the dashboard 201. With this arrangement, when the vehicle is running, vibration from front wheels and the engine is transmitted from the subframe to the crossmember 205. Therefore, it is desired to configure the crossmember 205 to be able to absorb collision energy from the vehicle front and running vibration.

However, there is a limit on efficient absorption of collision energy and running vibration with the crossmember 205. Thus, there is a demand for a structure in which collision energy acting from the vehicle front can be efficiently transmitted from a dashboard portion throughout the vehicle body.

SUMMARY OF THE INVENTION

According to the present invention, there is provided a front part structure of a vehicle body, which comprises: a dashboard for partitioning a front part of the vehicle body into an engine compartment and a passenger compartment which is formed rearward of the engine compartment; right and left front side members extending longitudinally of the vehicle body in the engine compartment; a crossmember attached to the dashboard and extending between the right and left front side members; and a floor tunnel extending longitudinally of the vehicle body and including a front end portion joined to a rear end portion of an extension extending rearward from the crossmember.

With this configuration of the present invention, collision energy acting from the front of the vehicle body is transmitted through the front side members to the crossmember, and is further efficiently transmitted through the extension of the crossmember to the front end portion of the floor tunnel, being efficiently and sufficiently dispersed throughout the vehicle body. As a result, the entire vehicle body can sufficiently absorb the collision energy, resulting in improved performance of the vehicle body in collision energy absorption.

Vibrations from front wheels and vibrations from an engine produced when the vehicle is running, or running vibrations are generally transmitted through a subframe to the crossmember. In this invention, the vibrations are not only absorbed by the crossmember but also transmitted to the floor tunnel via the extension and absorbed by that portion. Thus, the vehicle body can have improved performance in vibration absorption.

The front part structure of this invention preferably further comprises a reinforcing member of a substantially downward U-shape in a rear view, including right and left sidewalls. The front end portion of the floor tunnel and the extension of the crossmember have respective substantially downward U-shaped section bodies when viewed from the rear. The U-shaped section bodies each include steps formed at right and left upper portions thereof, respectively. The reinforcing member is placed on and joined to the U-shaped section bodies, so that the right and left steps formed at the front end portion of the floor tunnel and the right and left sidewalls of the reinforcing member form right and left closed-section portions extending longitudinally of the vehicle body, and the right and left steps formed at the extension of the crossmember and the right and left sidewalls of the reinforcing member form right and left closed-section portions extending longitudinally of the vehicle body. The right closed-section portions are connected to one another, and the left closed-section portions are connected to one another.

As described above, in this invention, using the reinforcing member, the longitudinally extending closed-section portions are formed along the right and left upper portions of the extension of the crossmember and the front end portion of the floor tunnel, respectively, and the right closed-section portions and the left closed-section portions are connected to one another, so that the rigidity of the joined portion of the floor tunnel to the extension can be increased. Consequently, collision energy acting from the front of the vehicle body is efficiently transmitted through the extension of the crossmember to the front end portion of the floor tunnel. As a result, the vehicle body has improved performance in collision energy absorption.

Since the rigidity of the joined portion of the floor tunnel to the extension is increased, this high-rigidity portion can also absorb vibration produced by vehicle running, and also can increase the entire rigidity of the vehicle body. As a result, the drivability of the vehicle is improved.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
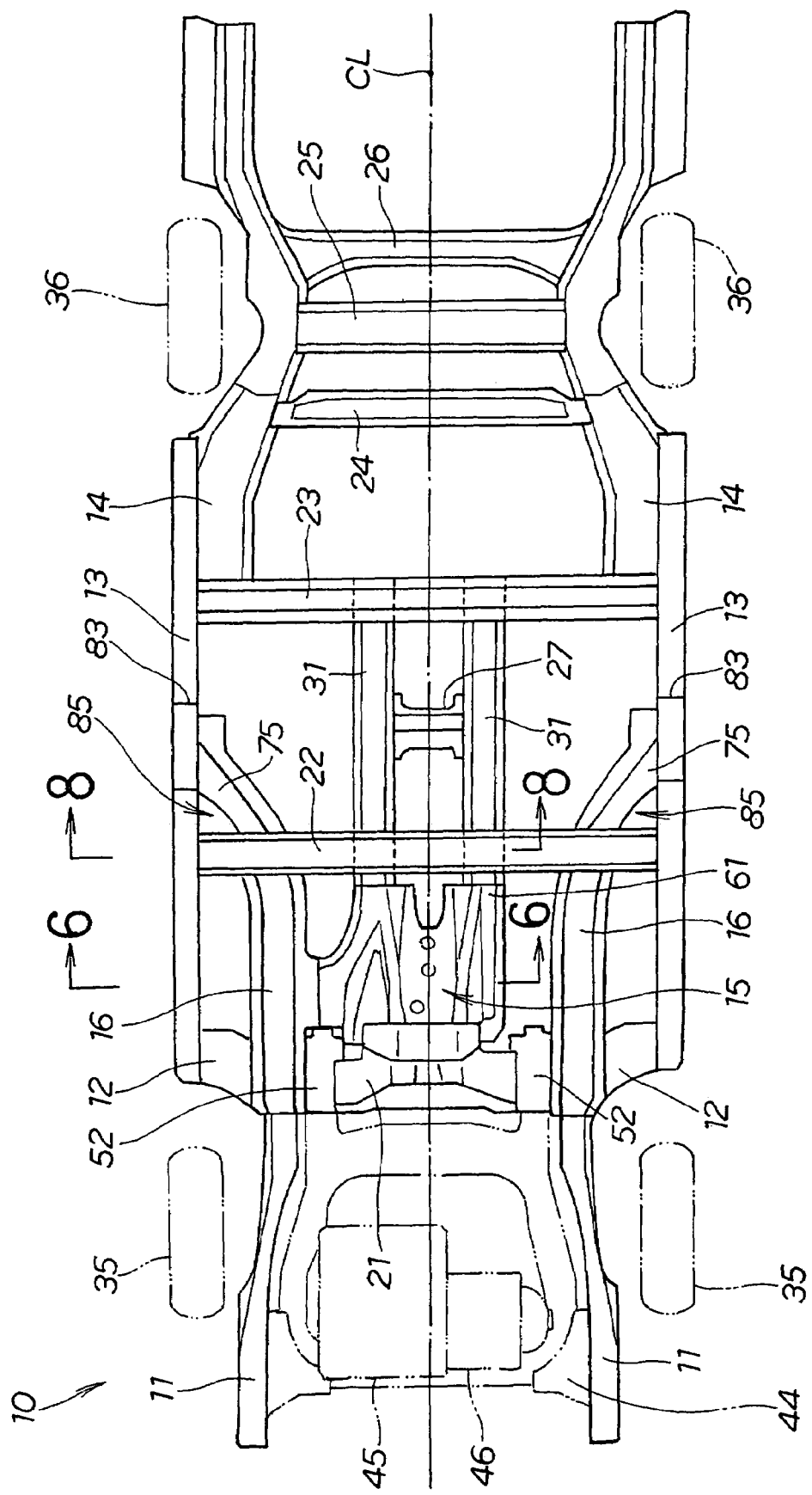
FIG. 1 is a plan view of a vehicle body according to the present invention, with a floor panel removed, a floor tunnel left.

FIG. 1 shows a vehicle body 10 with a floor panel removed, but a floor tunnel 15 is shown for convenience of description. Throughout the drawings the terms "front," "rear," "right" and "left" represent directions as viewed from a driver.

Referring to FIG. 1, the vehicle body 10 is a low-floor type vehicle body with a floor panel reduced in height. The vehicle body 10 is comprised of a vehicle frame mainly including front side members 11, 11, right and left side outriggers 12, 12, right and left side sills 13, 13, right and left rear side members 14, 14, a floor tunnel 15, floor frame members 16, 16, and crossmembers 21 to 26.

The right and left front side members 11, 11 are disposed at the front of the vehicle body 10, extending longitudinally of the vehicle body 10.

The right and left side outriggers 12, 12 are joined to rear side portions of the right and left front side members 11, 11.

The right and left side sills 13, 13 extend rearward from rear portions of the right and left side outriggers 12, 12.

The right and left rear side members 14, 14 extend rearward from rear portions of the right and left side sills 13, 13.

The floor tunnel 15 is disposed on the longitudinal center line CL, extending longitudinally of the vehicle body 10.

The floor frame members 16, 16 are disposed on the opposite sides of the floor tunnel 15, extending longitudinally of the vehicle body 10.

The six crossmembers 21, 22, 23, 24, 25 and 26 aligned longitudinally of the vehicle body 10 extend in a vehicle transverse direction. The six crossmembers 21 to 26 are aligned from the front of the vehicle body 10 to the rear in the order of the first crossmember 21, second crossmember 22, third crossmember 23, fourth crossmember 24, fifth crossmember 25 and sixth crossmember 26.

The first crossmember 21 will be described in detail below. The second and third crossmembers 22, 23 are disposed rearward of the floor tunnel 15 and extended between the right and left side sills 13, 13. The fourth, fifth and sixth crossmembers 24, 25 and 26 are extended between the right and left rear side members 14, 14

In a common vehicle, the floor tunnel 15 extends to the third crossmember 23. In the present invention, which adopts a front-engine front-drive system (FF system) as a power transmission system of the vehicle, it is not necessary to extend a propeller shaft through the floor tunnel 15. However, it is necessary to dispose various types of equipment in the vicinity of a front half portion of the floor tunnel 15, preventing complete elimination of the floor tunnel 15. A rear half portion of the floor tunnel 15 can be reduced in height to provide a large passenger compartment and improve comfort.

For this reason, in the present invention, the floor tunnel 15 is shortened to the extent of extending to the front of the second crossmember 22. Right and left center frame members 31, 31 extend rearward from the rear of the floor tunnel 15. The center frame members 31, 31 are located lower than the floor tunnel 15.

More specifically, a rear end portion 61 of the short floor tunnel 15 is joined to the second crossmember 22 and the third crossmember 23 via the pair of right and left center frame members 31, 31. The center frame members 31, 31 are aligned on the opposite sides of the longitudinal center line CL, extending longitudinally. A seventh crossmember 27 is extended between the right and left center frame members 31, 31. The rear end portion 61 of the floor tunnel 15 may alternatively be joined to the second crossmember 22 directly.

The right and left front side members 11, 11 extend forward from the front ends of the right and left floor frame members 16, 16.

The right and left floor frame members 16, 16 are disposed on the right and left of the longitudinal center line CL, respectively. The right and left side sills 13, 13 are disposed outside of the right and left floor frame members 16, 16, respectively.

Reference numerals 35, 35 denote right and left front wheels, and reference numerals 36, 36 denote right and left rear wheels.

Figure 2:
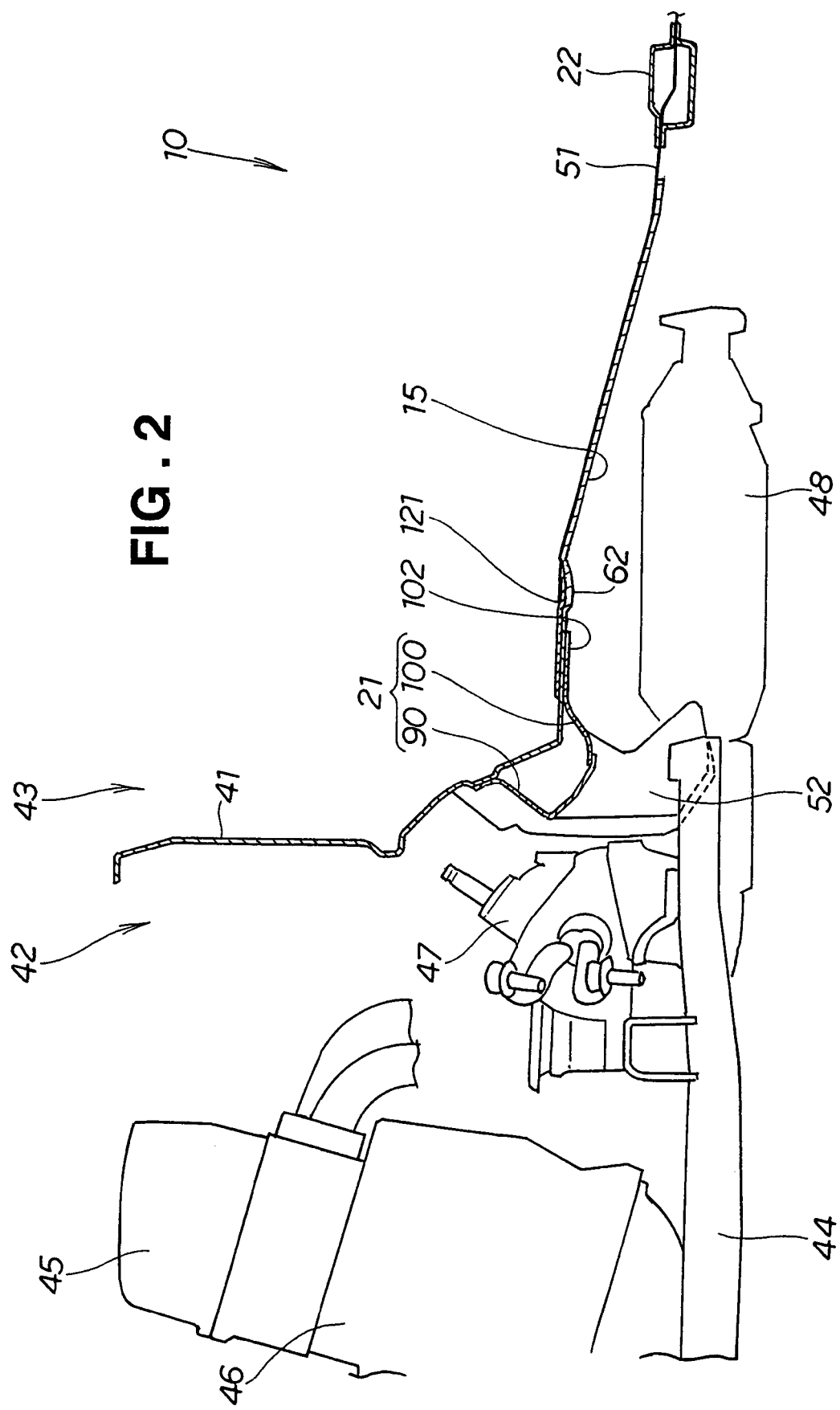
FIG. 2 is a cutaway view illustrating the configuration around a dashboard according to the present invention.

FIG. 2 shows components arranged in front of the floor tunnel 15.

As shown in FIG. 2, the vehicle body 10 is partitioned into an engine compartment 42 and a passenger compartment 43 by a dashboard 41. In the engine compartment 42, an engine-mounting subframe 44 is removably attached to the right and left front side members 11, 11 (see FIG. 1) extending longitudinally. On the engine-mounting subframe 44 are mounted an engine 45, a transmission 46 and a steering device 47. The first crossmember 21 is disposed at the bottom of the dashboard 41. Reference numeral 48 denotes an engine exhaust muffler.

Figure 3:
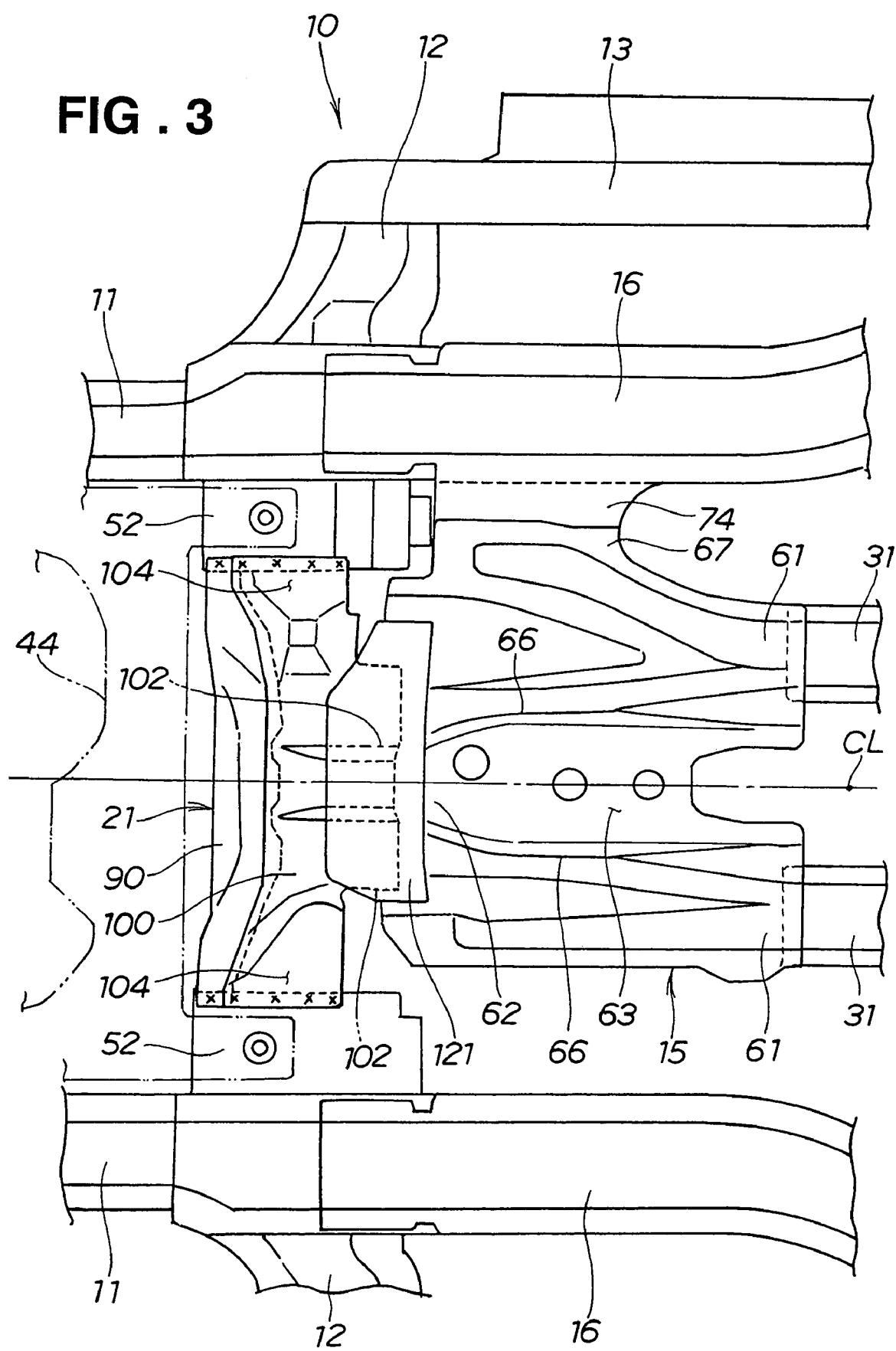
FIG. 3 is a plan view of the vehicle body, showing the floor tunnel and surrounding parts.

Referring to FIG. 3, the right and left front side members 11, 11 are provided with right and left brackets 52, 52, respectively, at the inner surfaces of their respective rear end portions. To the brackets 52, 52 are removably attached rear end portions of the engine-mounting subframe 44 shown in imaginary lines, so that the engine-mounting subframe 44 is attached to the front side members 11, 11.

Figure 4:
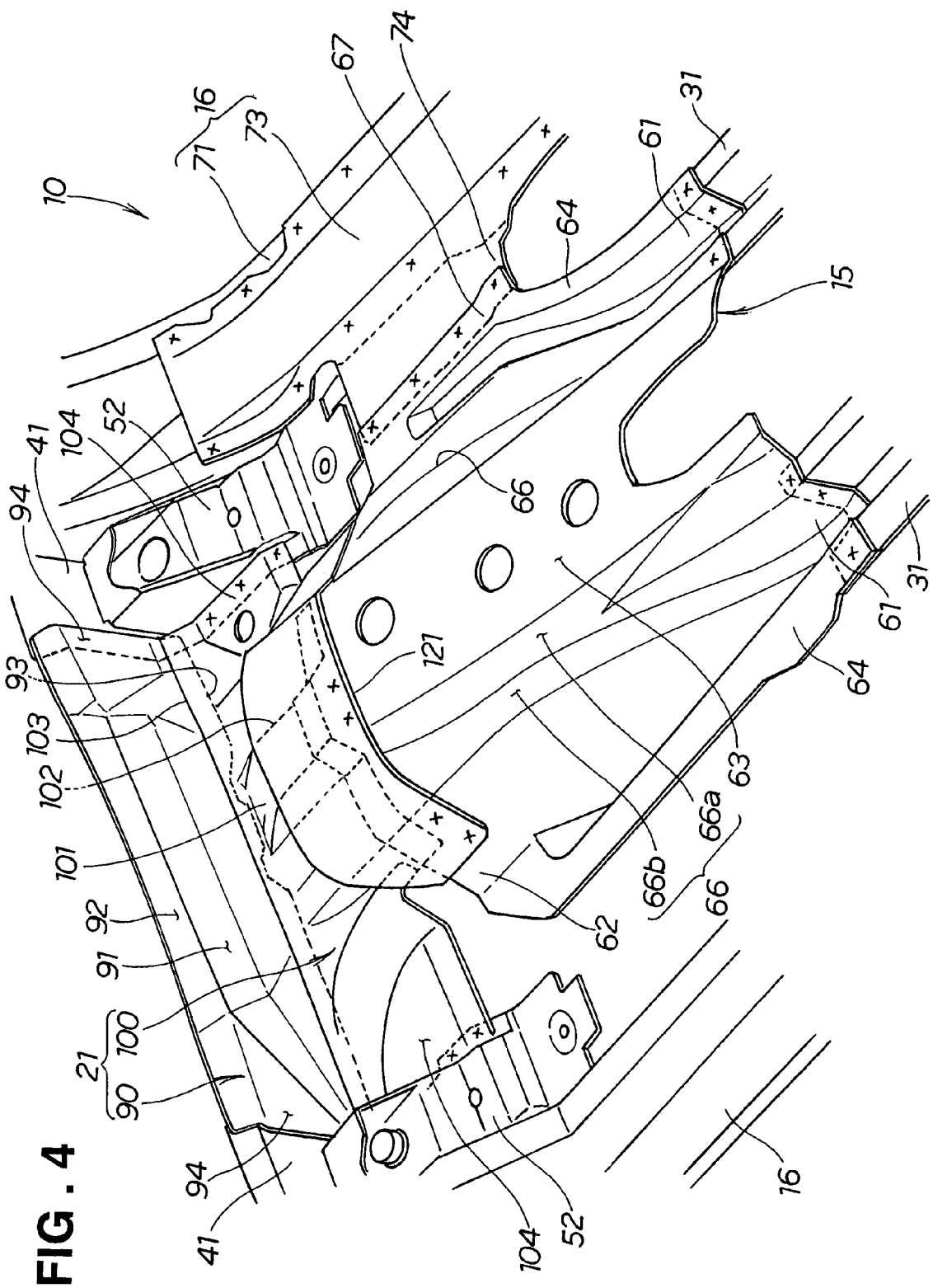
FIG. 4 is a perspective view of the floor tunnel and the surrounding parts shown in FIG. 3.
Figure 5:
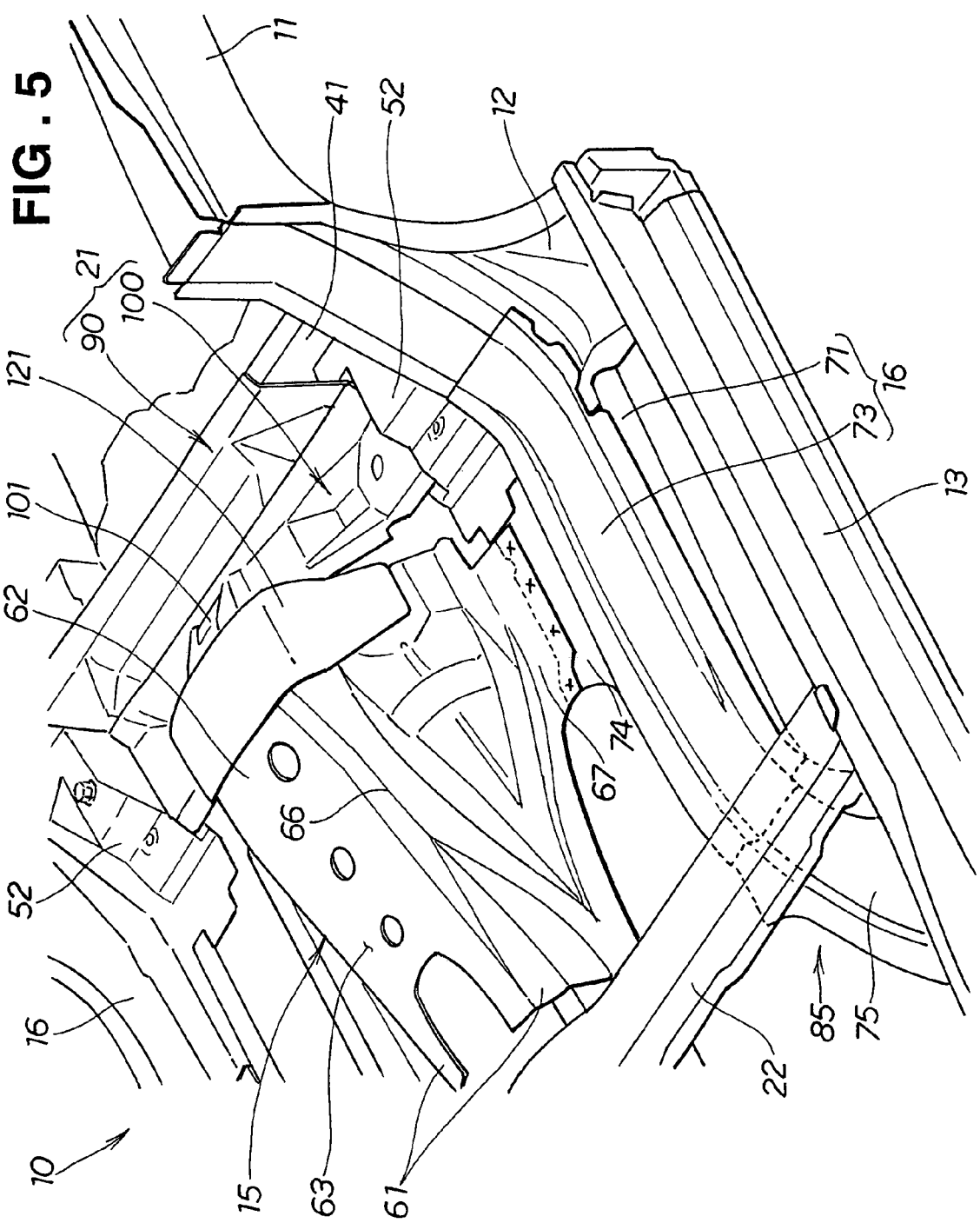
FIG. 5 is a perspective view of the floor tunnel and the surrounding parts when viewed from the opposite side to that in FIG. 4.

As shown in FIGS. 3 to 5, the floor tunnel 15 has a streamline shape gradually lowered from a front end portion 62 to the rear. Specifically, the floor tunnel 15 has a substantially rectangular shape in a plan view, including a top wall 63 sloped rearward and downward from the front end portion 62.

Figure 6:
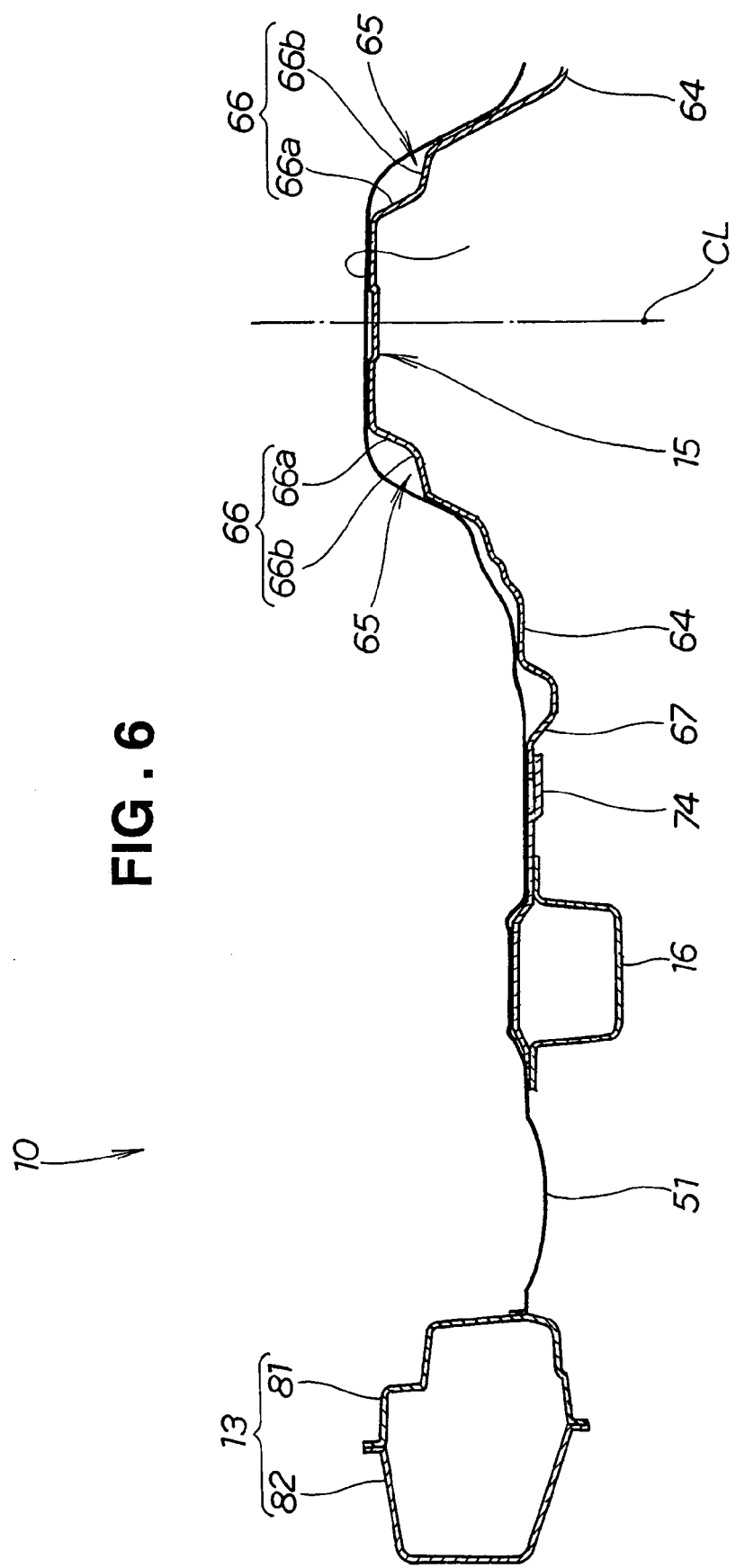
FIG. 6 is a cross-sectional view taken along line 6—6 of FIG. 1.

As shown in FIG. 6, the floor tunnel 15 is a bent part of a plate member and formed in a substantially downward U-shape in a front view. The right and left edges of the floor tunnel 15 constitute horizontal flanges 64, 64 extending toward the opposite right and left side sills 13, 13 (only one is shown), respectively. The plate thickness of the floor tunnel 15 is greater than that of the floor panel 51.

The floor panel 51 is a thin plate placed on and joined to the right and left floor frame members 16, 16 (only one is shown) and the floor tunnel 15, and also joined to the right and left side sills 13, 13 (only one is shown). The floor tunnel 15 is continuous with the floor panel 51. The floor tunnel 15 is in a higher level than the floor surface of the floor panel 51.

As shown in FIGS. 3 to 6, the floor tunnel 15, or the downward U-shaped section body 15 is provided with right and left steps 66, 66 formed by depressing right and left upper corners 65, 65 (see FIG. 6) in a step. Each step 66 consists of a bent-down portion 66a extending downward from the top wall 63 of the floor tunnel 15 and a step surface portion 66b extending laterally from the bottom of the bent-down portion 66a. The right and left steps 66, 66 extend rearward and downward along the top wall 63, so that the step surface portions 66b, 66b also extend rearward and downward, meeting the flanges 64, 64 at their respective rear ends.

As shown in FIGS. 3 and 4, the rear end portion 61 of the floor tunnel 15 is forked right and left. The pair of right and left center frame members 31, 31 are joined at their respective front ends to the fork branches by spot welding or the like. The center frame members 31, 31 are elongated beams in a hat-like shape in a cross-sectional view.

Now, the connection between the right and left floor frame members 16, 16 and the floor tunnel 15 will be described with reference to FIG. 7.

The right floor frame member 16 is a beam of a closed-section structure, configured by placing a substantially flat-plate cover portion 73 on a frame body 71 of a substantially U-shaped section opening upward in a front view, and joining them together by spot welding or the like. The frame body 71 includes flanges 72, 72 extending right and left from the top edges.

The right floor frame member 16, that is, the frame body 71 and the cover portion 73 are bent parts of plate members. The plate thickness of the frame body 71 and the cover portion 73 is greater than that of the floor panel 51.

Figure 7:
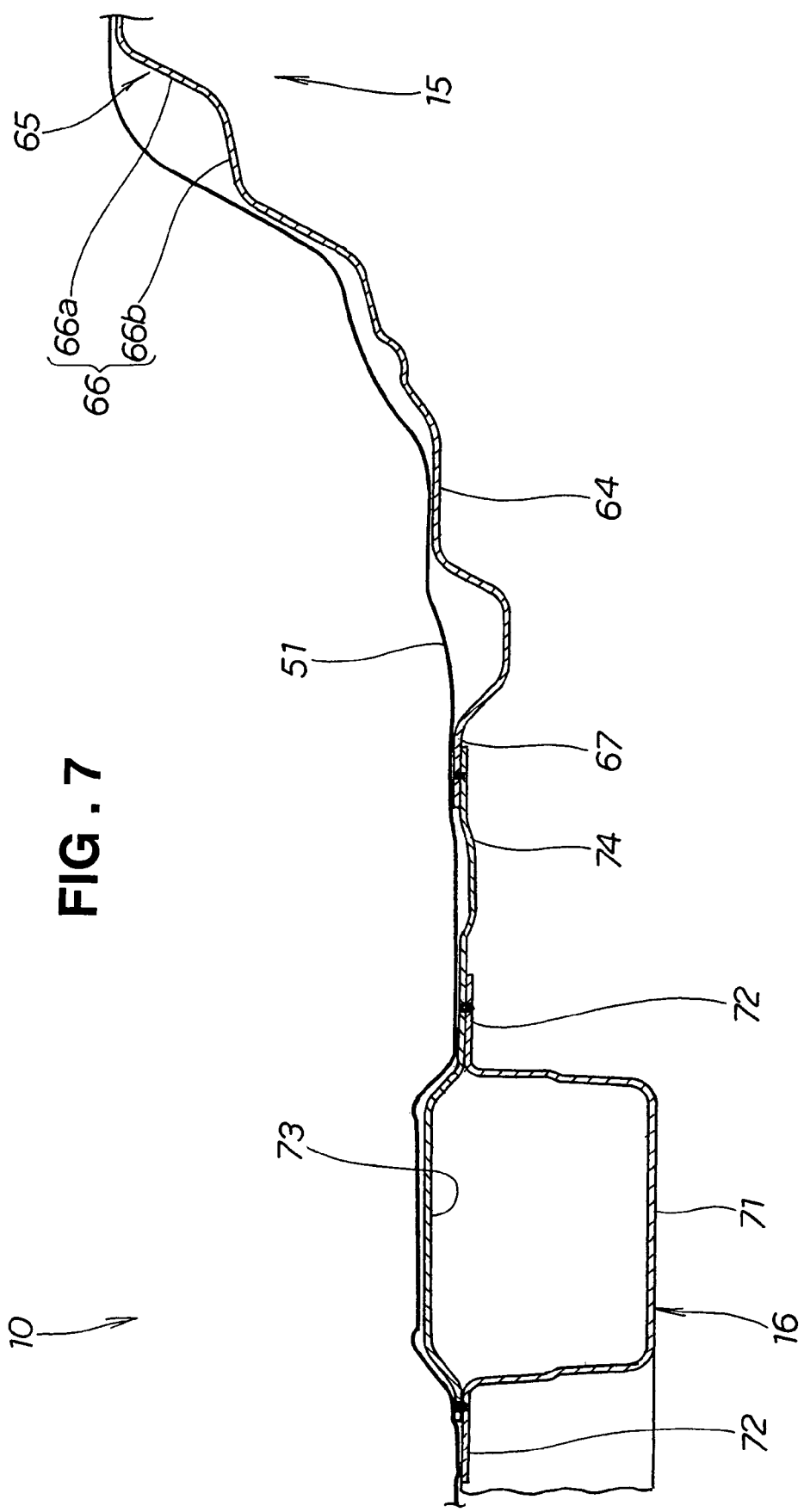
FIG. 7 is an enlarged view of a right floor frame member, the floor tunnel and surrounding parts shown in FIG. 6.

As shown in FIGS. 4, 5 and 7, the floor frame member 16 includes a frame side extension 74 which is a part of a substantially horizontal portion of a plate member constituting part of the floor frame member 16, such as a part of the cover portion 73, extending toward the floor tunnel 15.

The floor tunnel 15 includes a tunnel side extension 67 which is a part of a substantially horizontal portion of a plate member constituting the floor tunnel 15, such as a part of the flange 64, extending toward the floor fame member 16.

The tunnel side extension 67 is overlapped with the frame side extension 74 to join them by spot welding, thereby to join a front side portion of the floor tunnel 15 and a front side portion of the floor frame member 16 together.

The floor tunnel 15 and the floor frame member 16 are frame members of the vehicle body 10. Thus, the plate thickness of the plate members constituting them is greater than that of the floor panel 51. It is a very simple structure of just overlapping and joining the plate members of a large thickness, and the joining can be easily done.

The left floor frame member 16 has the same configuration as that of the right floor frame member 16. It is optional to join the left floor frame member 16 and the floor tunnel 15 in the same manner as the joint structure between the right floor frame member 16 and the floor tunnel 15.

Figure 8:
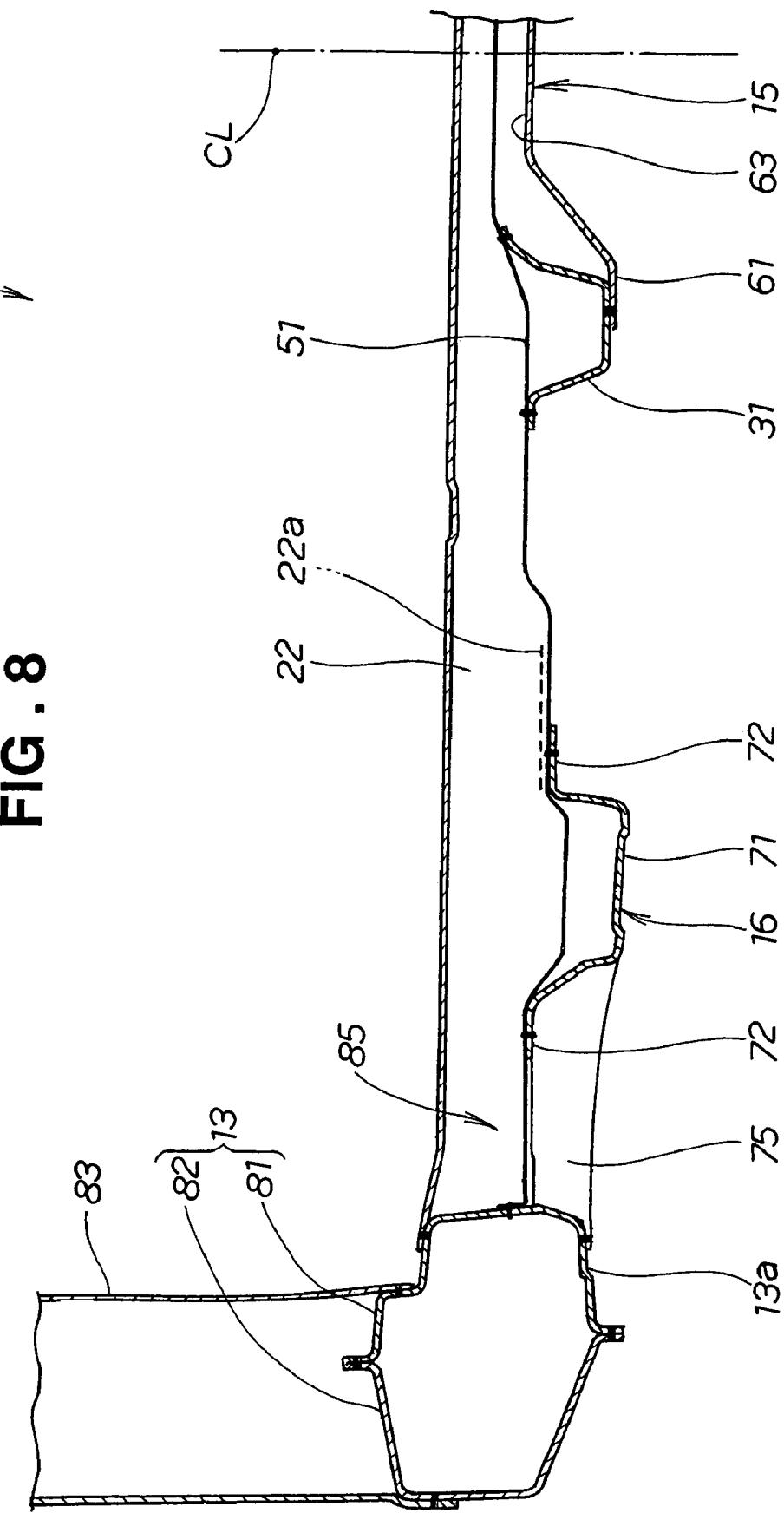
FIG. 8 is a cross-sectional view taken along line 8—8 of FIG. 1.
Figure 9:
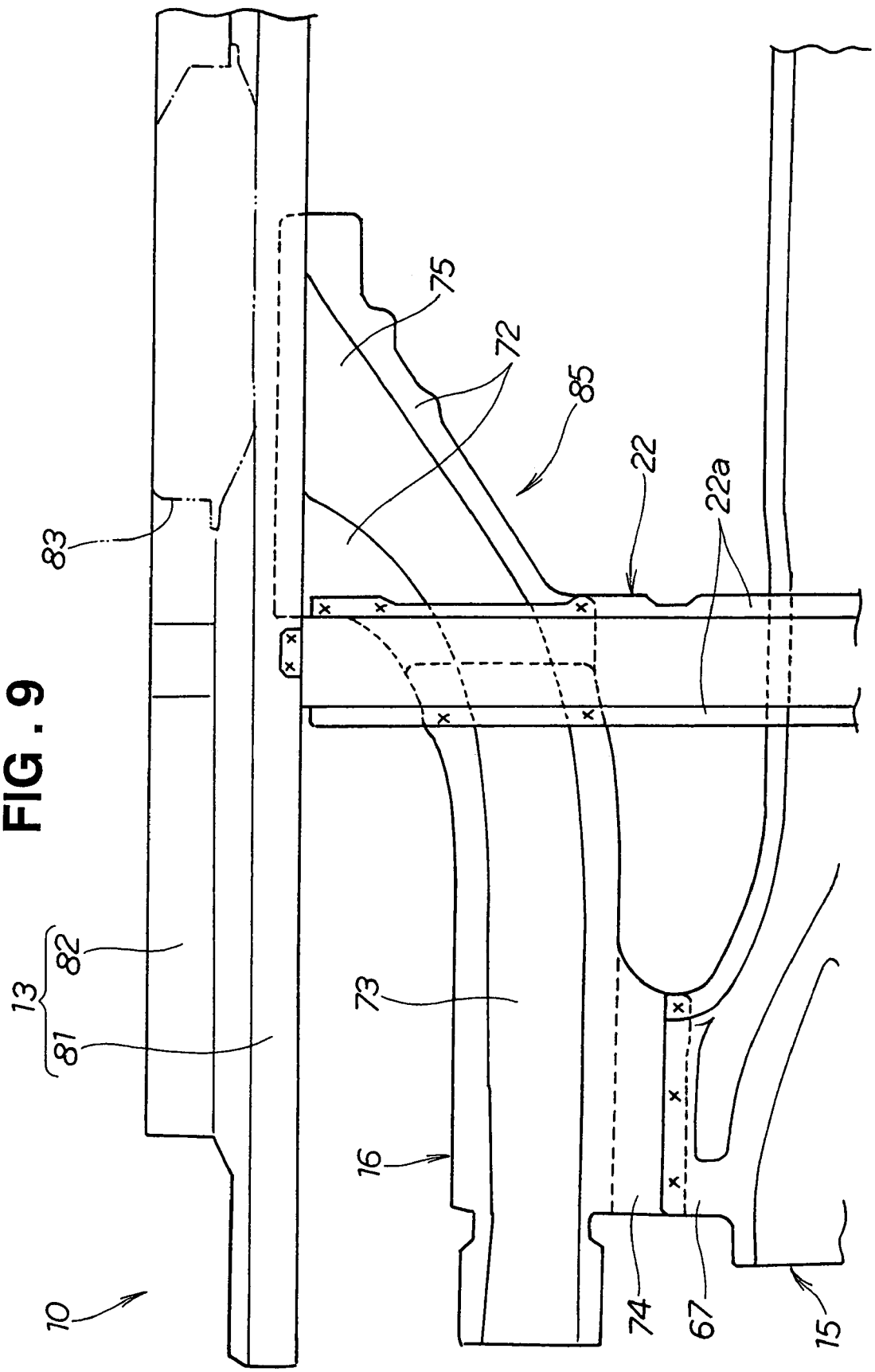
FIG. 9 is a plan view illustrating the connection between a right side sill and the right floor frame member.
Figure 10:
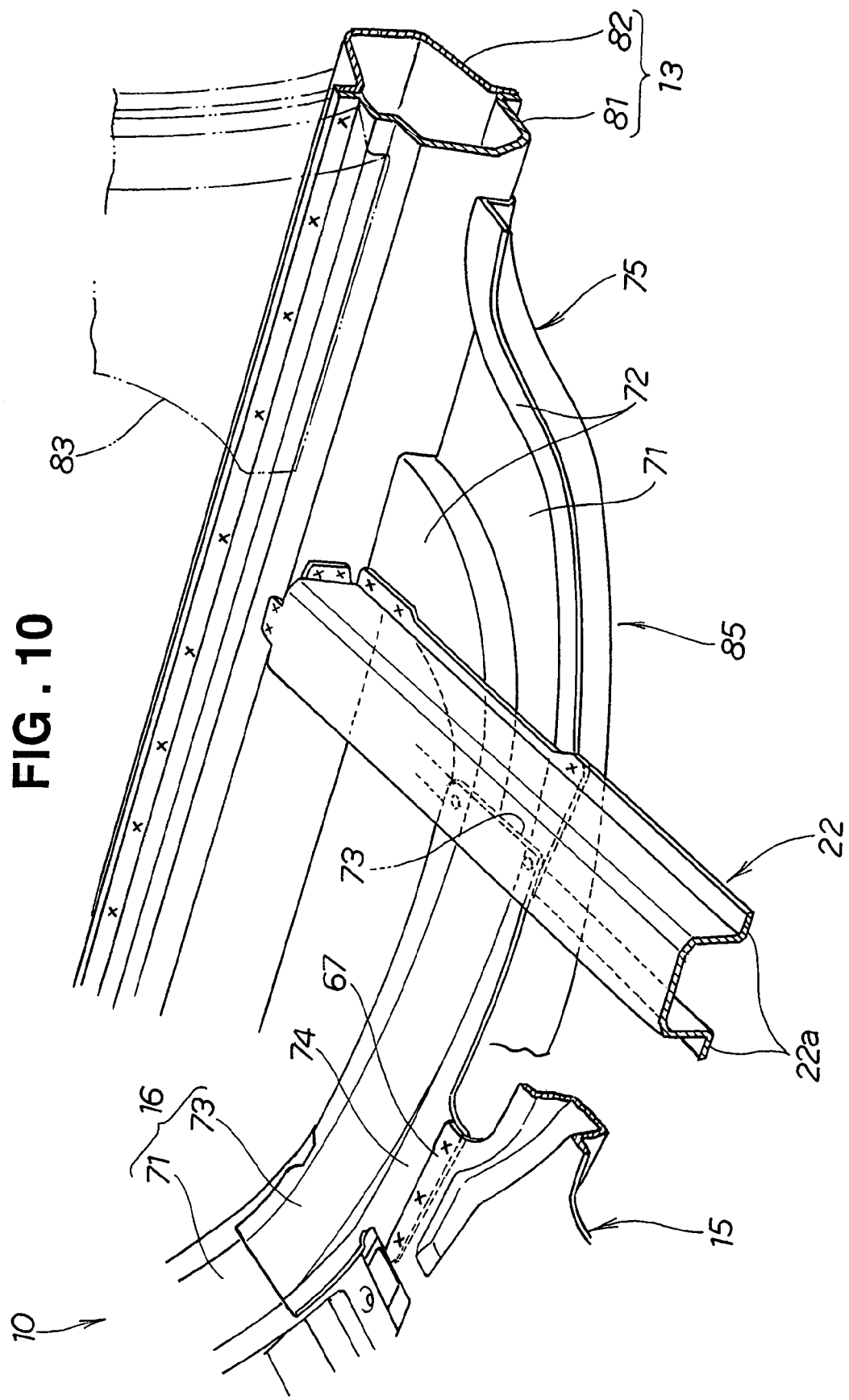
FIG. 10 is a perspective view illustrating the connection between the right side sill and the right floor frame member.

Now, the joint structure of rear end portions 75, 75 of the right and left floor frame members 16, 16 will be described with reference to FIGS. 8 to 10. FIG. 8 is a cross-sectional view taken along line 8—8 in FIG. 1, but shows the floor panel 51 in a mounted state. FIG. 9 illustrates the connection between the right side sill 13 and the right floor frame member 16 without showing the floor panel 51. FIG. 10 illustrates the connection between the right side sill 13 and the right floor frame member 16 without showing the floor panel 51.

As shown in FIG. 8, the side sill 13 is a closed-section beam of a combination of a side sill inner 81 located laterally inside and a side sill outer 82 located laterally outside. A center pillar 83 extends upward from the side sill 13.

As shown in FIGS. 1 and 9, the rear end portions 75, 75 of the right and left floor frame members 16, 16 are joined to longitudinally middle inner portions of the right and left side sills 13, 13. The second crossmember 22 is extended between the right and left side sills 13, 13 in front of the joints and in the vicinity of the joints. The rear end portions 75, 75 of the right and left floor frame members 16, 16 are also joined to the second crossmember 22.

With this arrangement, the joint between the left side sill 13, the left floor frame member 16 and the second cross member 22 can constitute a joint structure of a substantially triangular shape in a plan view, or a triangular joint 85. The joint between the right side sill 13, the right floor frame member 16 and the second crossmember 22 constitutes a joint structure of a substantially triangular shape in a plan view, or a triangular joint 85. The formation of the right and left triangular joints 85, 85 allows the side sills 13, 13, the floor frame members 16, 16 and the second crossmember 22 to complement one another in rigidity.

Thus, the strength and rigidity of the vehicle body 10 can be sufficiently provided without extending the floor frame members 16, 16 to the rear of the vehicle body 10.

When collision energy acts on the front of the front side members 11, the collision energy is transmitted from the front side members 11 to the floor frame members 16. The transmitted collision energy is efficiently dispersed through the rear end portions 75 of the floor frame members 16 into the side sills 13 and the second crossmember 22.

Specifically, as shown in FIGS. 8 and 10, the floor frame member 16 extends rearward, being smaller in thickness to come into contact with a bottom surface 13a of the side sill 13 (see FIG. 8), that is, extends rearward in a tapered shape. As shown in FIGS. 9 and 10, the rear end portion 75 of the floor frame member 16 has a widening shape, curving toward the side sill 13, broadening, when viewed from the top.

The second crossmember 22 has a U-shaped section shape opening downward, including flanges 22a, 22a extending substantially horizontally from the opposite bottom edges, to be placed on and joined to the floor frame members 16 and the center frame members 31.

The floor frame members 16 and the second cross member 22 are fastened together by placing the flanges 22a, 22a of the second crossmember 22 on the floor frame members 16 and joining them by spot welding.

The side sills 13 and the second crossmember 22 are fastened together by joining the ends of the second crossmember 22 to the side sills 13 by spot welding.

Figure 11:
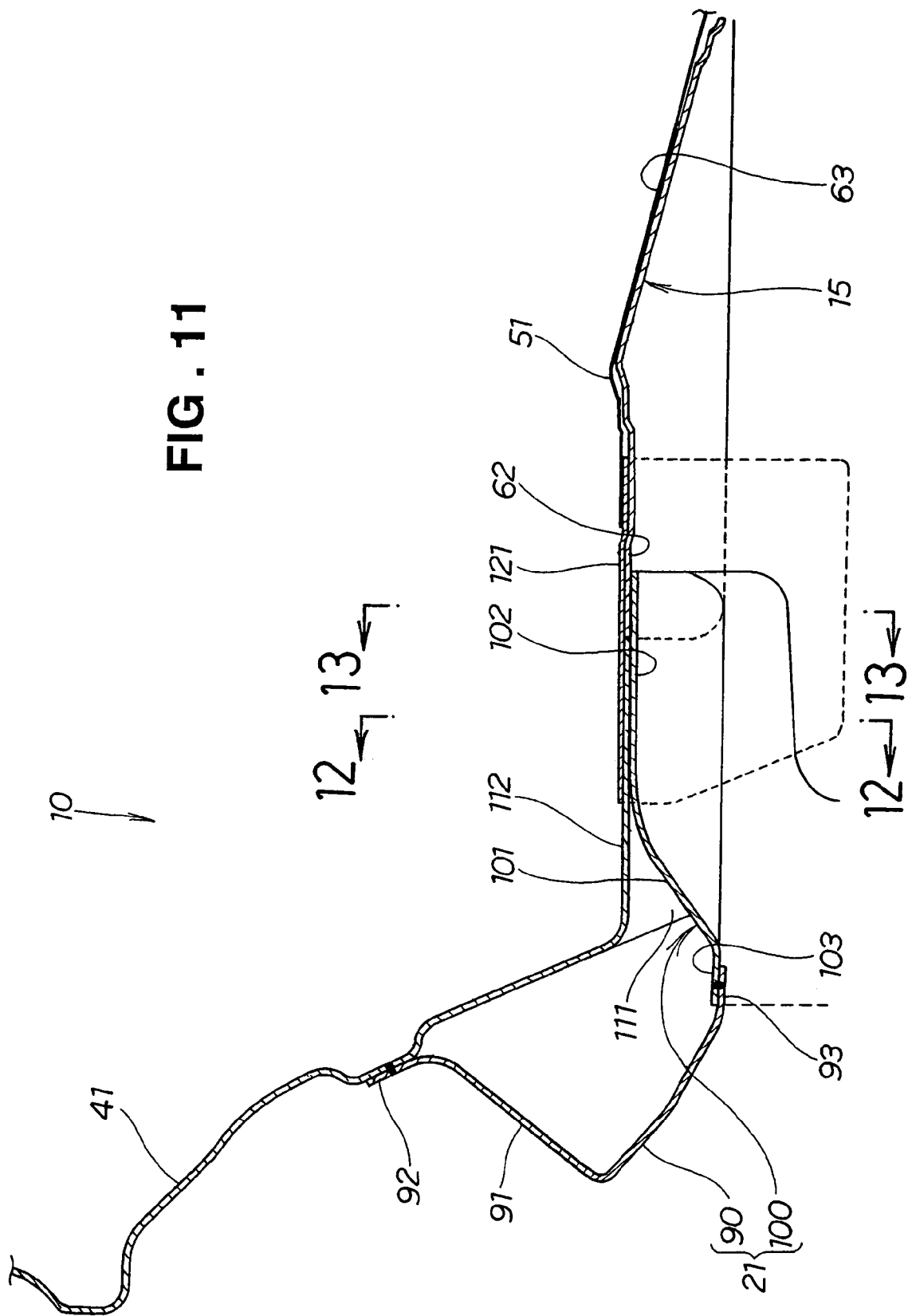
FIG. 11 is a cross-sectional view illustrating the joints between the floor tunnel, a first crossmember and the dashboard.
Figure 12:
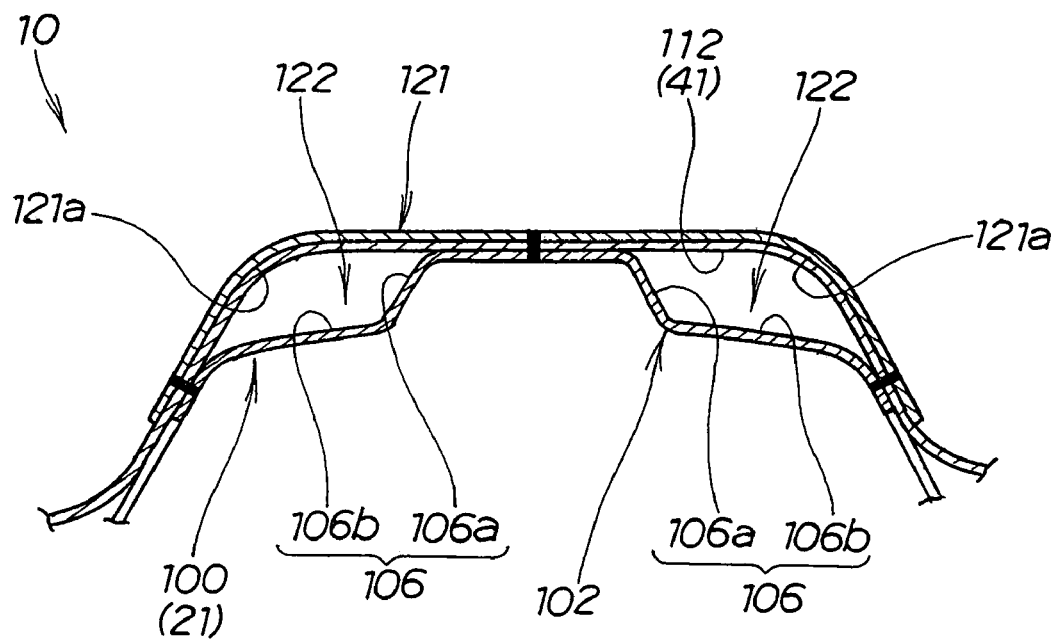
FIG. 12 is a cross-sectional view taken along line 12—12 of FIG. 11.
Figure 13:
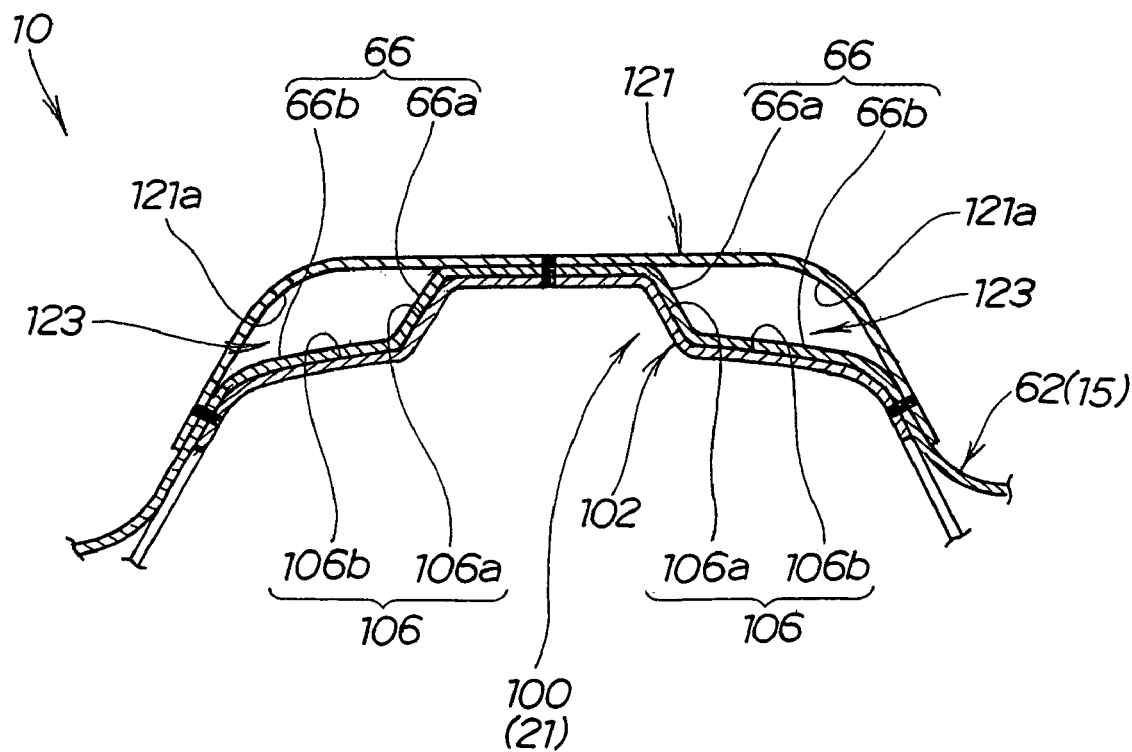
FIG. 13 is a cross-sectional view taken along line 13—13 of FIG. 11.
Figure 14:
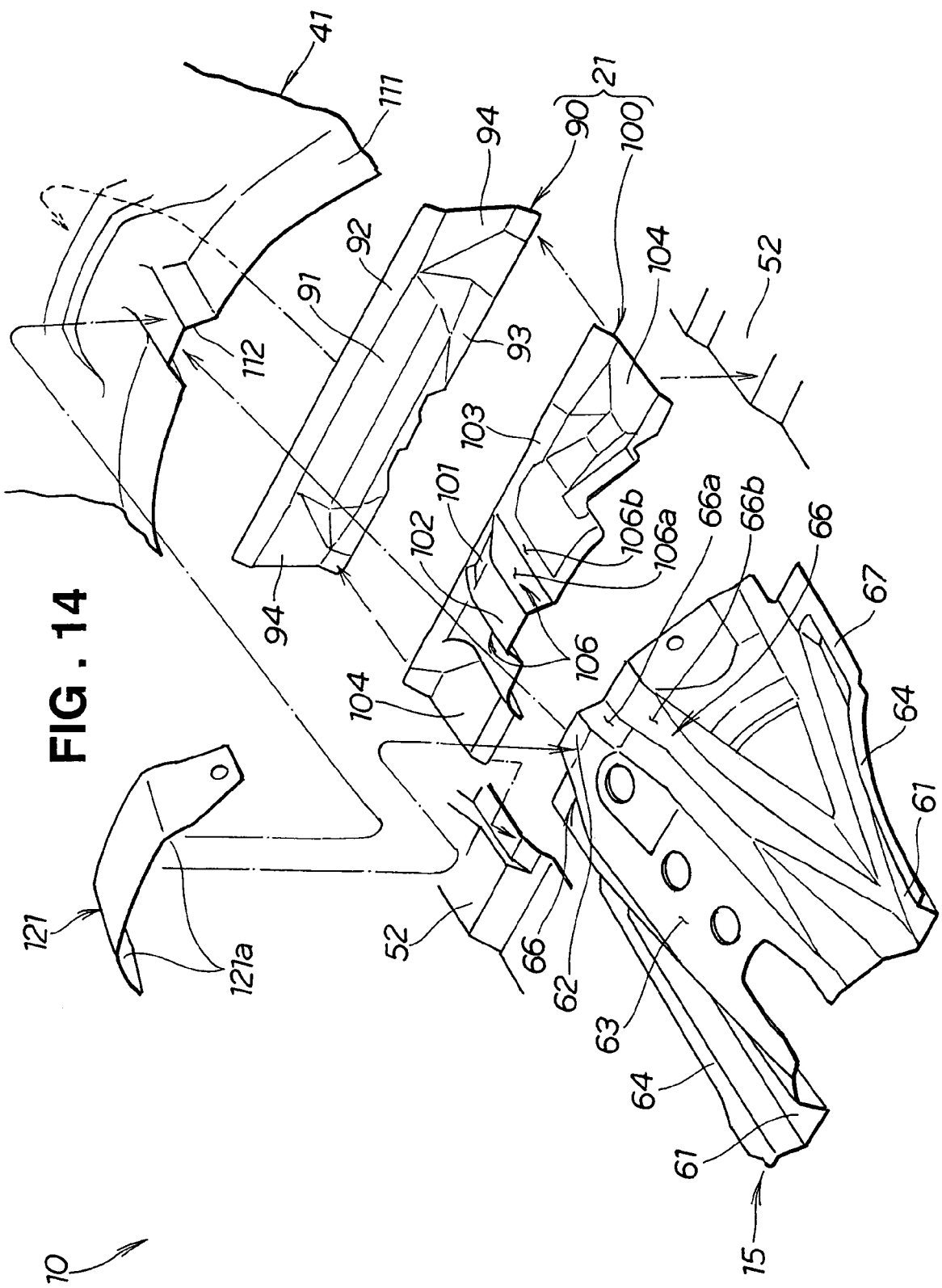
FIG. 14 is an exploded view of the floor tunnel, the first crossmember and the dashboard.
Figure 15:
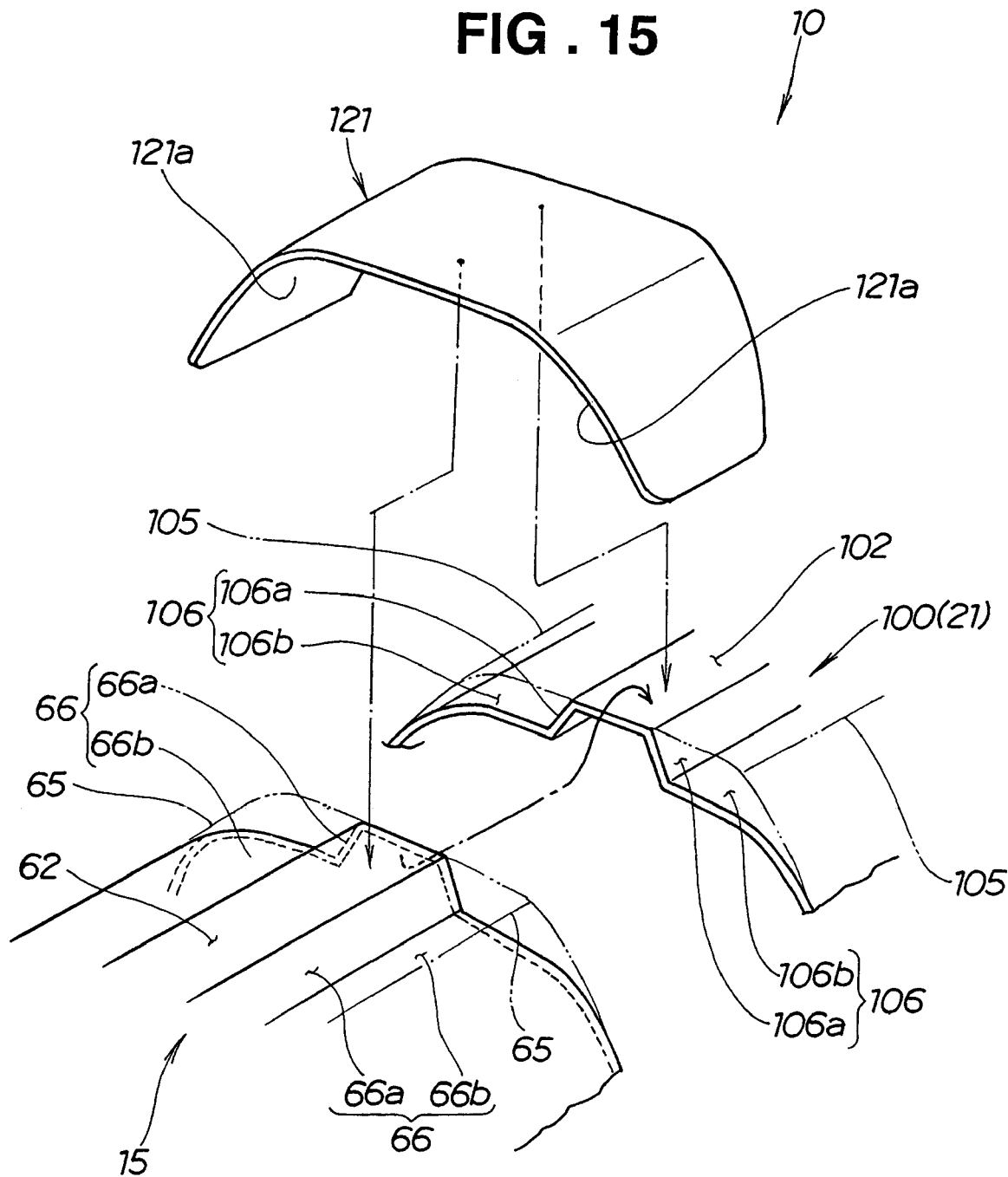
FIG. 15 is an exploded view of the floor tunnel and the first crossmember.

Now, a joint structure between the floor tunnel 15, the first crossmember 21 and the dashboard 41 will be described with reference to FIGS. 11 to 15. FIG. 11 illustrates the joint structure between the floor tunnel 15, the first crossmember 21 and the dashboard 41. FIG. 12 illustrates a cross section taken along line 12—12 in FIG. 11. FIG. 13 illustrates a cross section taken along line 13—13 in FIG. 11. FIG. 14 illustrates an exploded view of the floor tunnel 15, the first crossmember 21 and the dashboard 41. FIG. 15 illustrates and exploded view of the floor tunnel 15 and the first crossmember 21.

As shown in FIGS. 11 and 14, the first crossmember 21 consists of a front member half 90 and a rear member half 100. The front member half 90 and the rear member half 100 are bent parts of transversely elongated plate members.

The front member half 90 includes a body 91 of a substantially L-shape protruding forward in a cross-sectional view (see FIG. 11), an upper flange 92 extending upward from the upper edge of the body 91 of the L-shaped section body, a horizontal lower flange 93 extending rearward from the lower edge of the body 91, and right and left side flanges 94, 94 (see FIG. 14) extending laterally from the opposite ends of the body 91.

The rear member half 100 includes a body 101 of downward U-shaped section in a rear view, an extension 102 extending rearward from the rear edge of the body 101, a front flange 103 extending forward from the front lower edge of the body 101, and right and left side flanges 104, 104 (see FIG. 14) extending laterally from the opposite ends of the body 101. The extension 102 has a downward U-shaped section in a rear view, like the body 101.

The dashboard 41 is a plate member integrally formed with a lower flange 111 extending rearward from the lower edge and a tunnel portion 112 which can be fitted onto the body 101 and the extension 102 of the rear member half 100 at a width center portion of the lower flange 111. The tunnel portion 112 has a downward U-shaped section in a rear view.

The upper flange 92 of the front member half 90 is placed on and joined to a front lower surface of the dashboard 41. The front flange 103 of the rear member half 100 is placed on and joined to the lower flange 93 of the front member half 90. The tunnel portion 112 of the dashboard 41 is placed on and joined to the body 101 of the rear member half 100. In this manner, the first crossmember 21 is fastened to a front lower portion of the dashboard 41.

The first crossmember 21 may be combined with the dashboard 41 to form a closed-section body extending transversely. The first crossmember 21 of the closed-section body thus has greater strength and rigidity. The dashboard 41 is effectively utilized as a part of the closed-section body, resulting in a reduced weight.

As shown in FIGS. 3, 4 and 14, the right and left side flanges 104, 104 of the rear member half 100 of the first crossmember 21 are overlapped with and joined to the right and left brackets 52, 52 provided at the front side members 11, 11, thereby to extend the first crossmember 21 between the right and left front side members 11, 11.

As shown in FIGS. 11 to 14, the extension 102 and the front end portion 62 of the floor tunnel 15 are downward U-shaped section bodies when viewed from the rear, which U-shaped section bodies are sized to be able to be vertically fitted to one another.

The body 101 and the extension 102 of the rear member half 100 include right and left steps 106, 106 formed by depressing in a step right and left upper corners 105, 105 which are shown in chain double-dashed lines in FIG. 15. Each step 106 includes a bent-down portion 106a extending downward from the top surface and a step surface portion 106b extending laterally from the bottom of the bent-down portion 106a.

The front end portion 62 of the floor tunnel 15, the first crossmember 21 and the dashboard 41 constitute a structure in which: (1) the front end portion 62 of the floor tunnel 15 is placed on a rear half portion of the extension 102; (2) the tunnel portion 112 of the dashboard 41 is placed on the body 101 and a front half portion of the extension 102 of the rear member half 100; (3) the rear end of the tunnel portion 112 of the dashboard 41 is abutted on the front end of the floor tunnel 15 shown in FIG. 11; (4) a single reinforcing member 121 of a downward U-shape in a rear view is placed on the front end portion 62 of the floor tunnel 15 and on the tunnel portion 112; and (5) the members 62, 102, 111, 112 and 121 are joined by spot welding. In this manner, the front end portion 62 of the floor tunnel 15 is joined to the rear end portion of the extension 102.

The reinforcing member 121 is a bent part of a plate member, and, as described above, is a wear plate placed on the front end portion 62 of the floor tunnel 15 and on the tunnel portion 112 of the dashboard 41. The plate thickness of the reinforcing member 121 is approximately the same as that of the floor tunnel 15, the first crossmember 21 and the dashboard 41.

As shown in FIG. 1, collision energy acting from the front of the vehicle body 10 is transmitted through the right and left front side members 11, 11 to the first crossmember 21, and is further efficiently transmitted through the extension 102 (see FIG. 14) of the first crossmember 21 to the front end portion 62 of the floor tunnel 15. Consequently, the collision energy can be efficiently and sufficiently dispersed throughout the vehicle body 10. As a result, the entire vehicle body 10 can sufficiently absorb the collision energy, resulting in improved performance of the vehicle body 10 in collision energy absorption.

When the vehicle is running, vibrations from the front wheels 35, 35 shown in FIG. 1 and vibrations from the engine 45, or running vibrations are generally transmitted from the subframe 44 to the first crossmember 21 through the front side members 11, 11 and the brackets 52, 52.

The preset invention allows the vibrations to be not only absorbed by the first crossmember 21 but also transmitted to the floor tunnel 15 via the extension 102 and absorbed by that portion. Thus, the vehicle body 10 has improved vibration absorption performance.

As shown in FIGS. 11 to 13 and FIG. 15, on the first crossmember 21, the single reinforcing member 121 is placed on the extension 102, the front end portion 62 and the tunnel portion 112 and joined together. Consequently, the right and left steps 106, 106 (see FIG. 15) of the extension 102 and right and left sidewalls 121a, 121a of the reinforcing member 121 form closed-section portions 122, 122 (see FIG. 12) extending longitudinally. Also, the right and left steps 66, 66 (see FIG. 15) of the floor tunnel 15 and the right and left sidewalls 121a, 121a of the reinforcing member 121 form closed-section portions 123, 123 (see FIG. 13) extending longitudinally. The right closed-section portions 122, 123 and the left closed-section portions 122, 123 are continuous with one another.

In this manner, the longitudinally extending closed-section portions 122, 122 are formed along the right and left upper corners 105, 105 (see FIG. 15) of the extension 102, and also the longitudinally extending closed-section portions 123, 123 are formed along the right and left upper corners 65, 65 (see FIG. 15) of the floor tunnel 15. The right closed-section portions 122, 123 and the left closed-section portions 122, 123 are continuous with one another, increasing the rigidity of the joined portion of the floor tunnel 15 to the extension 102.

Collision energy acting from the front of the vehicle body 10 is thus efficiently transmitted through the extension 102 of the first crossmember 21 to the front end portion 62 of the floor tunnel 15. The vehicle body 10 thus has improved performance in collision energy absorption.

Since the rigidity of the joined portion of the floor tunnel 15 to the extension 102 is increased, the high-rigidity portion and the floor tunnel 15 also absorb vibration caused by vehicle running, and also increase the entire rigidity of the vehicle body 10, improving the drivability of the vehicle.

Figure 16A:
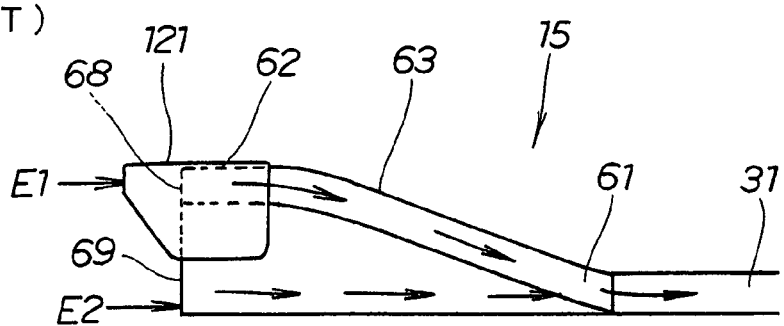
FIGS. 16A, 16B and 16C are diagrams illustrating an embodiment of the present invention and a comparative example when collision energy acts on a floor tunnel.
Figure 16B:
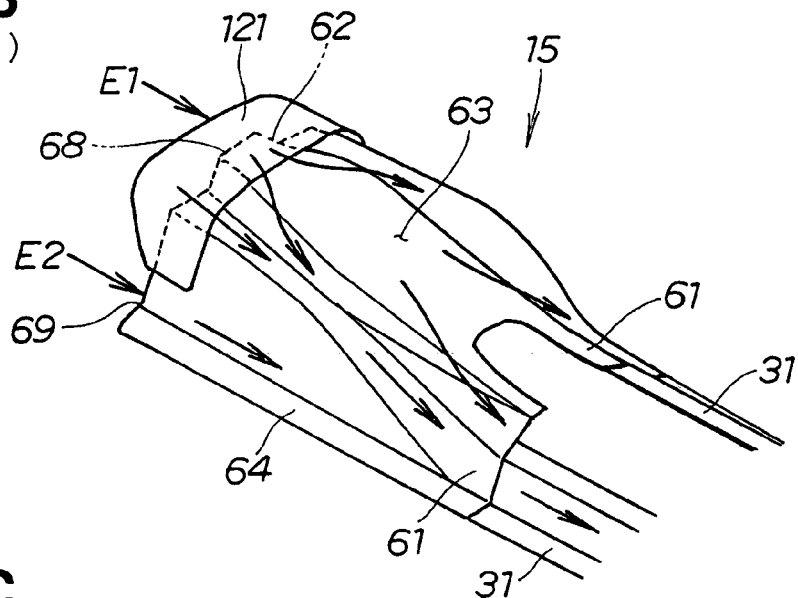

Now, the action of collision energy on the floor tunnel 15 of the above configuration will be described with reference to FIGS. 16A to 16C. FIGS. 16A and 16B illustrate the floor tunnel 15 in this embodiment, and FIG. 16C illustrates a floor tunnel 15A as a comparative example.

Figure 16C:
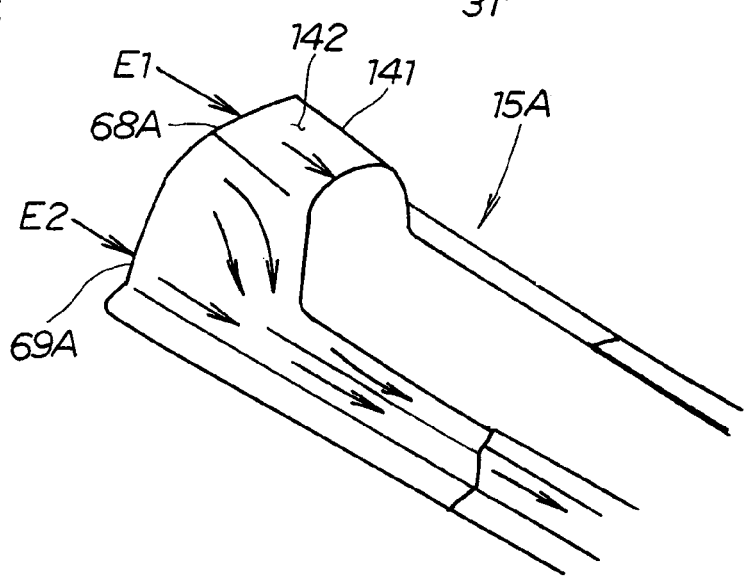

The floor tunnel 15A in the comparative example shown in FIG. 16C has a tunnel portion 141 only at its front half portion, and the rear end of the tunnel portion 141 is formed almost vertically. A top wall 142 of the tunnel portion 141 is substantially horizontal.

When collision energy acts on the front of the vehicle body 10 shown in FIG. 1, plastically deforming the front of the vehicle body 10, the subframe 44 mounted to the front of the vehicle body 10 and the engine 45 mounted on the subframe 44 are moved rearward. As a result, the retreated engine 45 in a high level strikes a front upper edge 68A of the floor tunnel 15A shown in FIG. 16C, and collision energy E1 acts on the front upper edge 68A. Also, from the retreated subframe 44 in a low level (see FIG. 1), collision energy E2 acts on a front lower edge 69A of the floor tunnel 15A.

In this manner, the collision energy E1, E2 is transmitted from both the retreated high-level engine 45 and low-level subframe 44 to the floor tunnel 15A. In order to efficiently transmit the collision energy E1 acting on the front upper edge 68A to the rear of the floor tunnel 15A at that time, it has room for improvement.

In the present embodiment shown in FIGS. 16A and 16B, the top wall 63 of the floor tunnel 15 is sloped rearward and downward from the front end portion 62. Therefore, when collision energy E1 acts on a front upper edge 68 of the floor tunnel 15, the collision energy E1 is efficiently transmitted rearward and downward of the floor tunnel 15 along the downslope, and is further efficiently transmitted through the rearward second and third crossmembers 22, 23 (see FIG. 1) to the vehicle rear.

When collision energy E2 acts on a front lower edge 69 of the floor tunnel 15, the collision energy E2 is directly and efficiently transmitted to the rear of the floor tunnel 15, and is further efficiently transmitted through the rearward second and third crossmembers 22, 23 (see FIG. 1) to the vehicle rear.

There is no need to provide a member for efficiently transmitting the collision energy E1, E2 from the floor tunnel 15 to the vehicle rear, and thus the vehicle weight can be reduced.

In addition, a rear half portion of the floor tunnel 15 can be reduced in height to make the passenger compartment larger, improving the comfort of the passenger compartment.

Figure 17A:
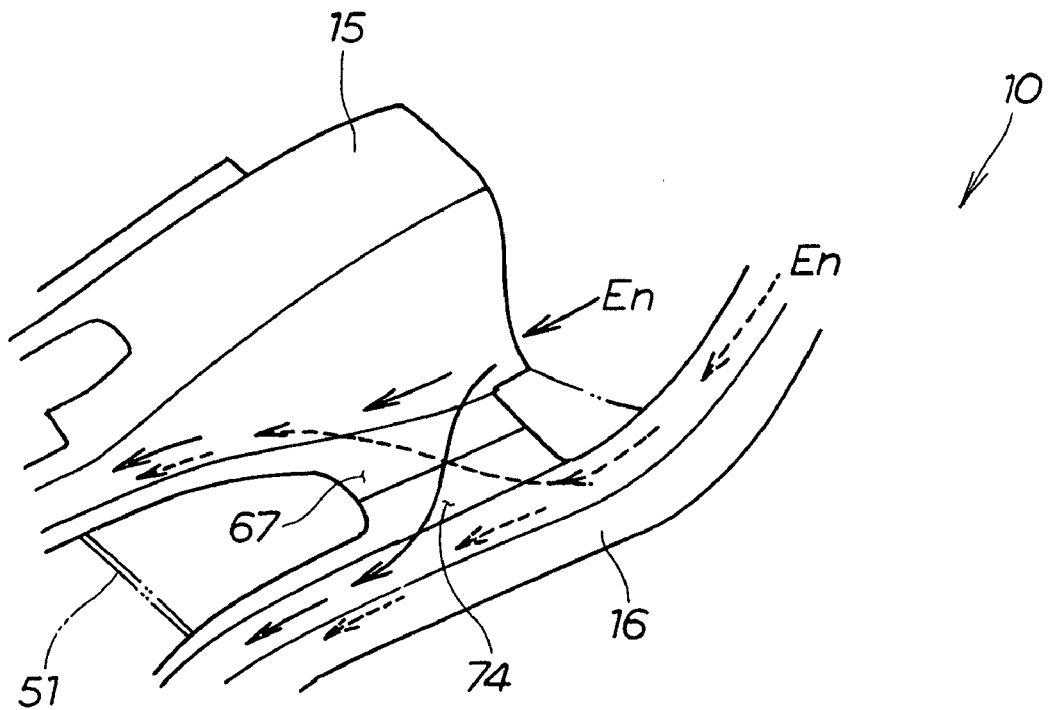
FIGS. 17A and 17B are diagrams illustrating the embodiment and a comparative example when collision energy acts on a floor tunnel and a floor frame member.
Figure 17B:
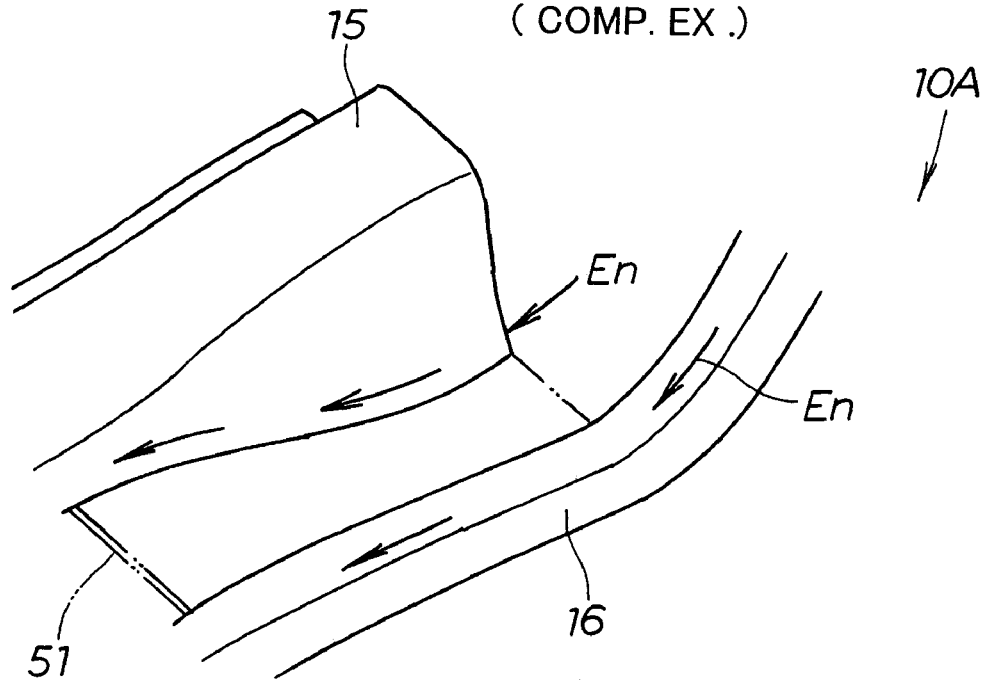

Now, the action of collision energy on the joined floor tunnel 15 and floor frame member 16 will be described with reference to FIGS. 17A and 17B. FIG. 17A illustrates the joined floor tunnel 15 and floor frame member 16 in this embodiment. FIG. 17B illustrates a floor tunnel 15 and a floor frame member 16 in a comparative example.

A vehicle body 10A in the comparative example shown in FIG. 17B has a structure in which the floor frame member 16 is separated from the floor tunnel 15 and a floor panel 51 continuous with the floor tunnel 15 is placed on and joined to right and left floor frame members 16.

When collision energy En acts from the front of the vehicle body 10A, the collision energy En is transmitted and dispersed through the floor frame member 16 to the floor panel 51, and is also transmitted and dispersed from the floor tunnel 15 to the floor panel 51. With this structure, it is difficult to set the amount of retreat and the amount of plastic deformation of the floor frame member 16 equal to the amount of plastic deformation of the floor tunnel 15. The floor panel 51 can thus be deformed between the floor tunnel 15 and the floor frame member 16.

In the present embodiment shown in FIG. 17A, since the front side portion of the floor frame member 16 is directly joined to the front side portion of the floor tunnel 15 via the tunnel side extension 67 and the frame side extension 74, the floor tunnel 15 and the floor frame member 16 can disperse a longitudinal load therebetween into one another. Also, the floor tunnel 15 and the floor frame member 16 can complement one another in strength and rigidity.

When collision energy En acts from the front of the vehicle body 10, the collision energy En acting on the floor tunnel 15 is directly transmitted and dispersed from the floor tunnel 15 to the floor frame member 16. Also, the collision energy En acting on the floor frame member 16 is directly transmitted and dispersed from the floor frame member 16 to the floor tunnel 15. Longitudinal displacement between the floor tunnel 15 and the floor frame member 16 can thus be prevented, resulting in prevention of deformation of the floor panel 51 between the floor tunnel 15 and the floor frame member 16. The prevention of deformation of the floor panel 51 ensures the joined state of the floor panel 51 to the floor tunnel 15 and the floor frame member 16.

This simple structure of only directly joining the front side portion of the floor tunnel 15 to the front side portion of the floor frame member 16 eliminates the need for providing an additional joining member. Thus, the vehicle body 10 is configured simply and the weight of the vehicle body 10 can be reduced.

Figure 18A:
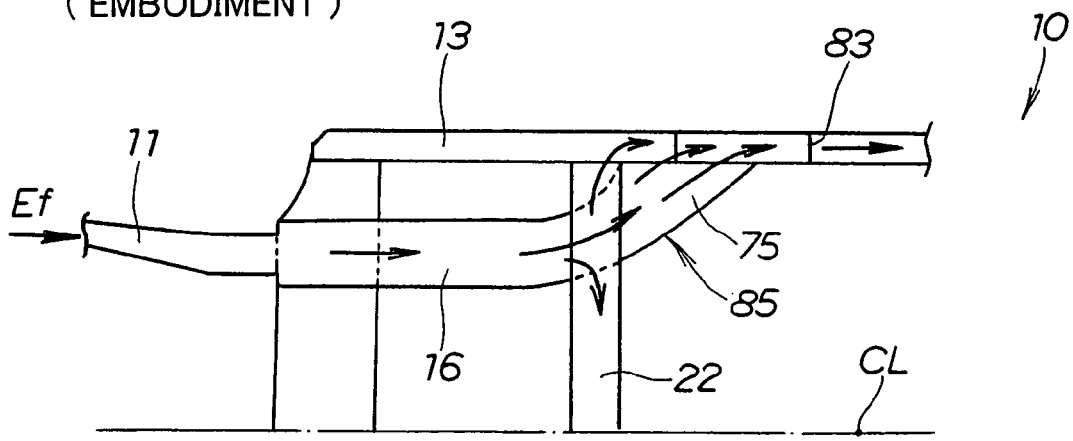
FIGS. 18A, 18B and 18C are diagrams illustrating the embodiment and a comparative example when collision energy acts from the front of a vehicle body on the vehicle body.
Figure 18B:
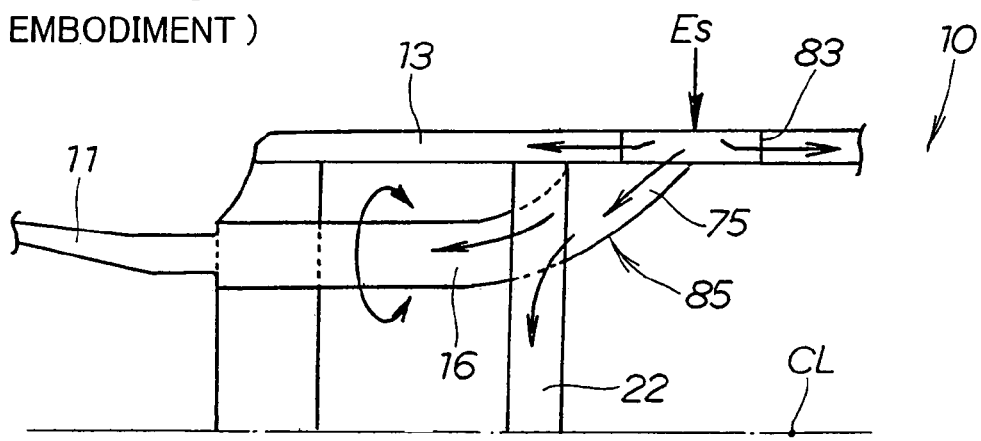
Figure 18C:
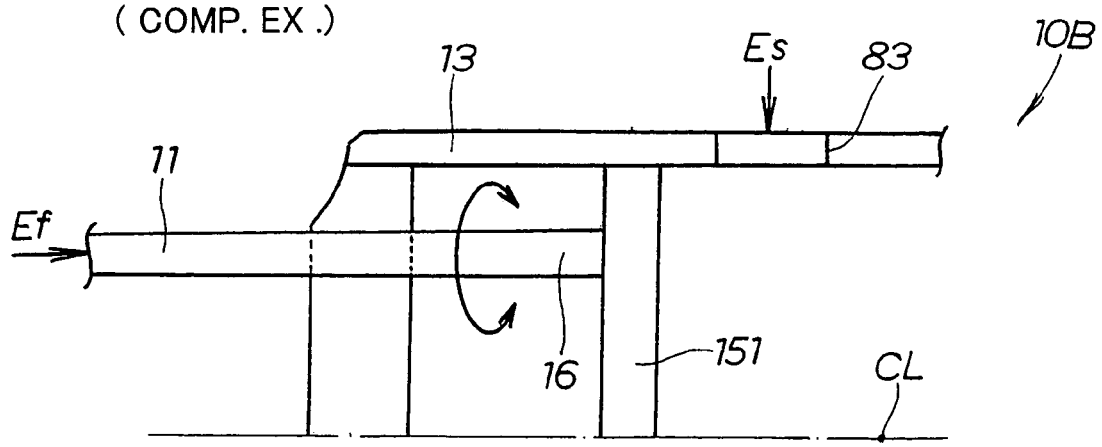
Figure 19:
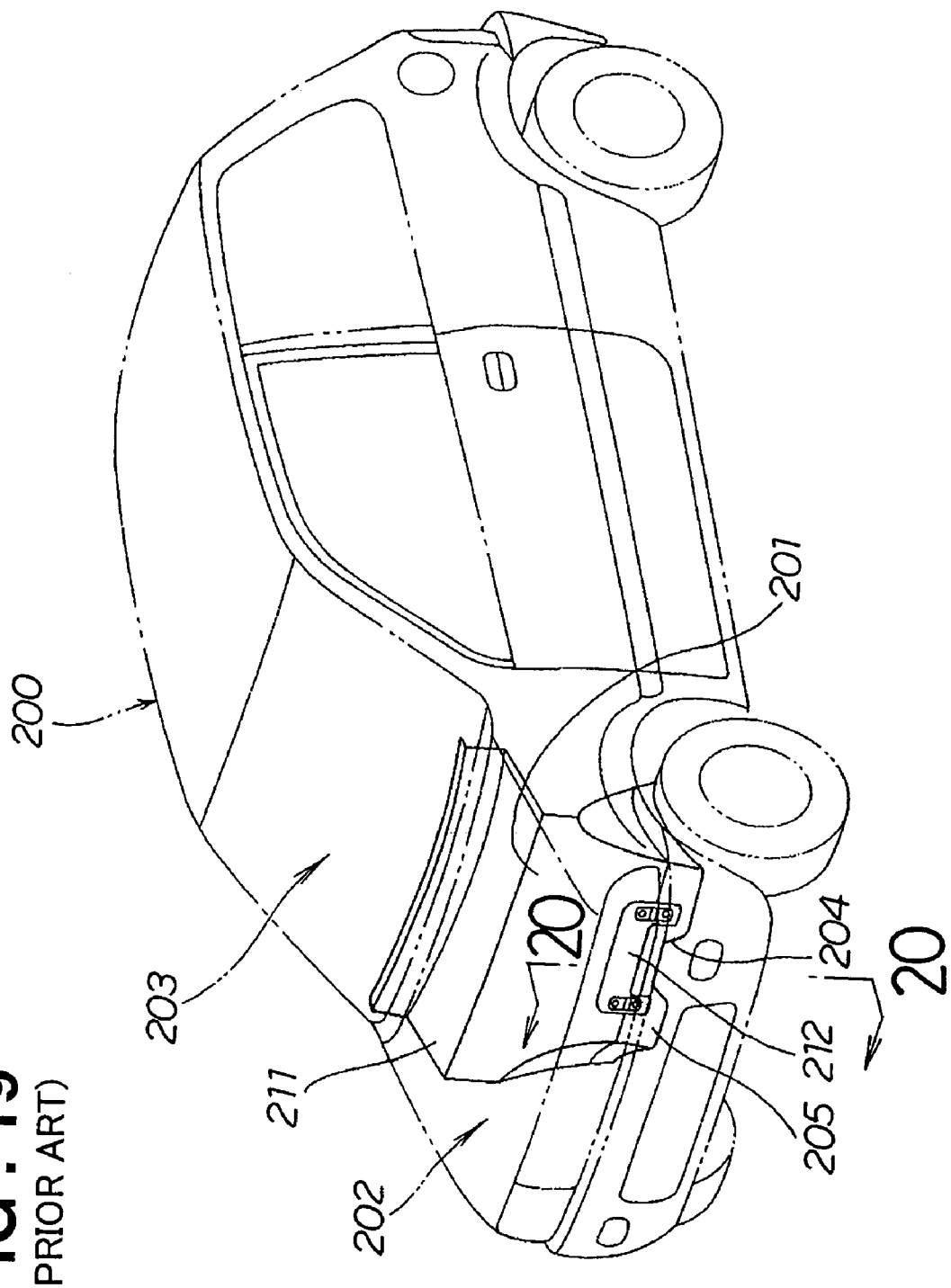
FIG. 19 is a schematic diagram of a conventional vehicle body structure provided with a floor tunnel.
Figure 20:
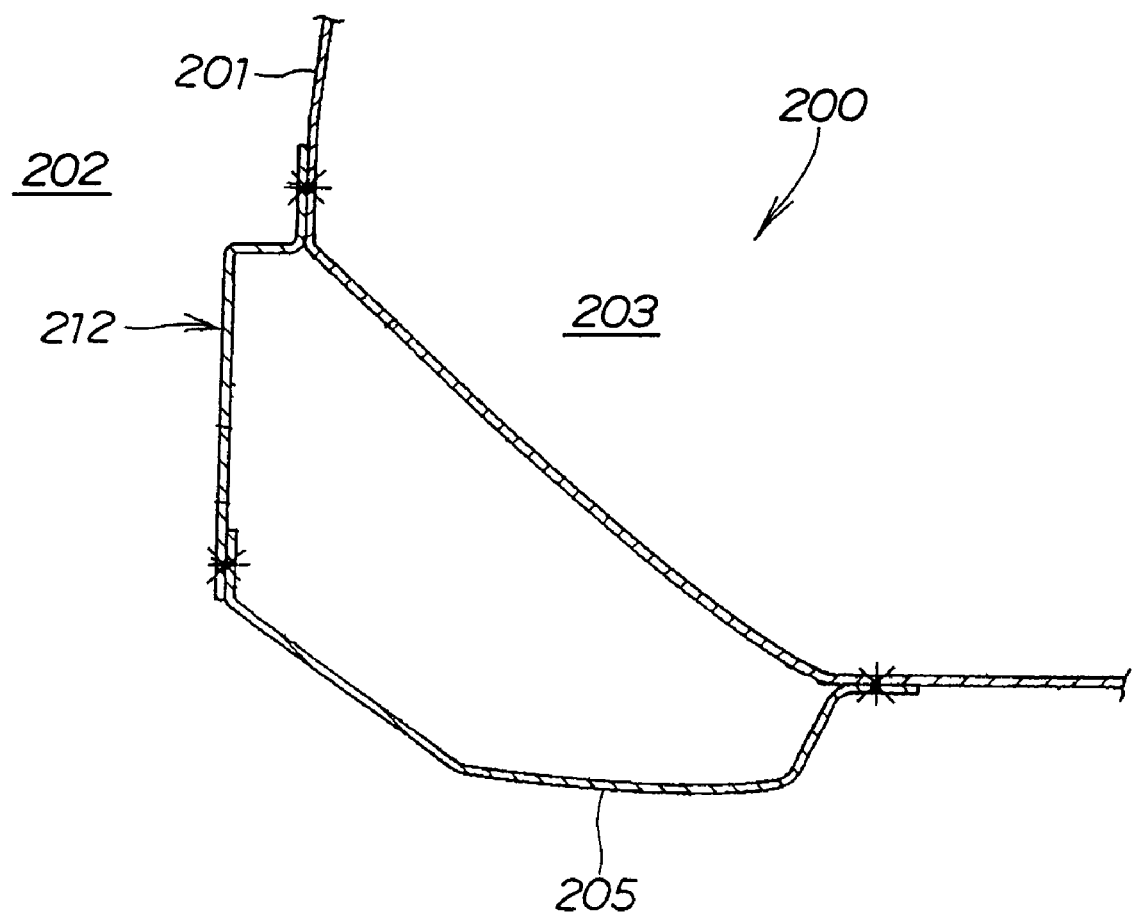
FIG. 20 is a cross-sectional view taken along line 20—20 of FIG. 19.

Now, the function of the triangular joints 85 formed by the side sills 13, the floor frame members 16 and the second crossmember 22 will be described with reference to FIGS. 18A to 18C. FIG. 18A illustrates collision energy Ef acting from the vehicle front on the vehicle body 10 in this embodiment. FIG. 18B illustrates collision energy Es acting from the vehicle side on the vehicle body 10 in this embodiment. FIG. 18C illustrates front collision energy Ef and side collision energy Es acting on a vehicle body 10B in a comparative example.

The vehicle body 10B in the comparative example shown in FIG. 18C has a structure in which: right and left floor frame members 16 (Only one is shown. Hereinafter the same.) closer to the longitudinal center line CL and right and left side sills 13 laterally outside of the floor frame members 16 are provided in parallel; a crossmember 151 is extended between the right and left side sills 13; the rear ends of the floor frame members 16 are joined to the crossmember 151; and front side members 11 are extended forward from the front ends of the floor frame members 16.

Collision energy Ef acting from the front of the vehicle body 10B is transmitted from the front side member 11 through the floor frame member 16 to the crossmember 151. However, there is room for improvement in efficiently dispersing the collision energy Ef from the crossmember 151 into the orthogonal side sill 13.

The impact energy Es acting from the side of the vehicle body 10B is transmitted from the side sill 13 to the crossmember 151. However, there is room for improvement in efficiently dispersing the collision energy Es from the crossmember 15 into the orthogonal floor frame member 16.

In the present embodiment shown in FIGS. 18A and 18B, the joint between the side sill 13, the floor frame member 16 and the second crossmember 22 has a substantially triangular joint structure in a plan view, or the triangular joint 85. The triangular joint 85 allows the side sill 13, the floor frame member 16 and the second crossmember 22 to complement one another in strength and rigidity.

As shown in FIG. 18A, collision energy Ef acting from the front of the vehicle body 10 is transmitted from the front side member 11 through the floor frame member 16 to the triangular joint 85, and is further efficiently dispersed from the triangular joint 85 to the second crossmember 22 and the side sill 13.

As shown in FIG. 18B, collision energy Es acting from the side of the vehicle body 10 is transmitted from the side sill 13 to the triangular joint 85, and is further efficiently dispersed from the triangular joint 85 to the floor frame member 16 and the second crossmember 22.

In this manner, both of the collision energy Ef acting from the front of the vehicle body 10 and the collision energy Es acting from the side of the vehicle body 10 are efficiently and sufficiently dispersed throughout the vehicle body 10. As a result, the collision energy Ef, Es is sufficiently absorbed by the entire vehicle body 10, resulting in improved performance of the vehicle body 10 in absorbing the collision energy Ef, Es. There is no need to make the components of the vehicle body 10 larger and to provide additional reinforcing members for reinforcing the components. Thus, the weight of the vehicle body 10 can be reduced, and sufficient space can be provided in the passenger compartment.

During vehicle running, vibration from the front wheels is generally transmitted via the front of the vehicle body 10 to the floor frame members 16. The vibration generally occurs in the direction of twisting the floor frame members 16 as shown by arrows in FIG. 18B.

In this embodiment, the second crossmember 22 is provided in a position forward of the joints between the side sills 13 and the rear end portions 75 of the floor frame members 16, and the floor frame members 16 are also joined to the second crossmember 22, so that the length of the floor frame members 16 can be shortened accordingly. Since rear portions of the floor frame members 16 each form part of the strong triangular joint 85, the twisting vibration of the floor frame members 16 can be reduced.

Obviously, various minor changes and modifications of the present invention are possible in the light of the above teaching. It is therefore to be understood that within the scope of the appended claims the invention may be practiced otherwise than as specifically described.

What is claimed is:

1. A front part structure of a vehicle body, comprising:
a dashboard for partitioning a front part of the vehicle body into an engine compartment and a passenger compartment, which is formed rearward of the engine compartment;
right and left front side members extending longitudinally of the vehicle body in the engine compartment;
a crossmember attached to the dashboard and extending between the right and left front side members, said cross member including an extension that extends rearwardly, said extension having a rear end portion;
a reinforcing member; and,
a floor tunnel extending longitudinally of the vehicle body, said floor tunnel including a front end portion that is overlapped with and joined to the rear end portion of the extension, and wherein said reinforcing member is secured to both said floor tunnel front end portion and said dashboard.

2. The front part structure of a vehicle body according to claim 1, wherein said reinforcing member has a substantially downward U-shape, when viewed from a rear, including right and left sidewalls, wherein:
the front end portion of the floor tunnel and the extension of the crossmember each have substantially downward U-shaped section bodies when viewed from the rear,
the U-shaped section bodies each include steps formed at right and left upper portions thereof, respectively,
the reinforcing member is placed on and joined to the U-shaped section bodies so that the right and left steps formed at the front end portion of the floor tunnel and the right and left sidewalls of the reinforcing member form right and left closed-section portions extending longitudinally of the vehicle body, and the right and left steps formed at the extension of the crossmember and the right and left sidewalls of the reinforcing member form right and left closed-section portions extending longitudinally of the vehicle body, and
the right closed-section portions are connected to one another, and the left closed-section portions are connected to one another.

3. A front part structure of a vehicle body, comprising:
a dashboard for partitioning a front part of the vehicle body into an engine compartment and a passenger compartment, which is formed rearward of the engine compartment;
right and left front side members extending longitudinally of the vehicle body in the engine compartment;
a crossmember attached to the dashboard and extending between the right and left front side members;
a floor tunnel extending longitudinally of the vehicle body and including a front end portion joined to a rear end portion of an extension extending rearward from the crossmember;
a reinforcing member of a substantially downward U-shape, when viewed from a rear, including right and left sidewalls, wherein:
the front end portion of the floor tunnel and the extension of the crossmember each have substantially downward U-shaped section bodies when viewed from the rear,
the U-shaped section bodies each include steps formed at right and left upper portions thereof, respectively,
the reinforcing member is placed on and joined to the U-shaped section bodies so that the right and left steps formed at the front end portion of the floor tunnel and the right and left sidewalls of the reinforcing member form right and left closed-section portions extending longitudinally of the vehicle body, and the right and left steps formed at the extension of the crossmember and the right and left sidewalls of the reinforcing member form right and left closed-section portions extending longitudinally of the vehicle body, and
the right closed-section portions are connected to one another, and the left closed-section portions are connected to one another.

* * * * *